(12) United States Patent
Obradovic et al.

(10) Patent No.: US 12,413,537 B2
(45) Date of Patent: Sep. 9, 2025

(54) SCHEDULING TRANSMISSIONS THROUGH A TELECOMMUNICATION NETWORK

(71) Applicant: Siemens Aktiengesellschaft, Munich (DE)

(72) Inventors: Dragan Obradovic, Ottobrunn (DE); Corinna Gottschalk, Munich (DE); Günter Steindl, Poppenricht (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 188 days.

(21) Appl. No.: 17/773,269

(22) PCT Filed: Oct. 30, 2019

(86) PCT No.: PCT/EP2019/079676
§ 371 (c)(1),
(2) Date: Apr. 29, 2022

(87) PCT Pub. No.: WO2021/083510
PCT Pub. Date: May 6, 2021

(65) Prior Publication Data
US 2024/0171527 A1    May 23, 2024

(51) Int. Cl.
*H04L 47/70* (2022.01)
*H04L 47/28* (2022.01)

(52) U.S. Cl.
CPC ............ *H04L 47/826* (2013.01); *H04L 47/28* (2013.01)

(58) Field of Classification Search
CPC ..... H04L 47/826; H04L 47/28; H04L 47/801; H04W 72/12
See application file for complete search history.

(56) References Cited

U.S. PATENT DOCUMENTS

| 6,009,077 A | 12/1999 | Firoiu et al. ................... 370/230 |
| 2006/0067235 A1 | 3/2006 | Acharya et al. ............... 370/238 |

(Continued)

FOREIGN PATENT DOCUMENTS

| CN | 101601203 A | 12/2009 | ............. H04B 7/216 |
| CN | 102714520 A | 10/2012 | ............... H04B 3/54 |

(Continued)

OTHER PUBLICATIONS

Nayak Naresh Ganesh et al "Incremental Flow Scheduling and Routing in Time-Sensitive Software-Defined Networks", IEEE Transactions On Industrial Informatics, IEEE Service Center, New York, NY, US, vol. 14, No. 5, May 1, 2018 (May 1, 2018), pp. 2066-2075 (hereinafter "Nayak") (Year: 2018).*

(Continued)

*Primary Examiner* — Sun Jong Kim
(74) *Attorney, Agent, or Firm* — Slayden Grubert Beard PLLC

(57) ABSTRACT

Teachings herein include computer-implemented methods for scheduling transmissions of a plurality data streams through a telecommunication network. A respective repetitive transmission of each of the data streams is transmitted from a first originator node, in one or more of a plurality of phases according to a respective repetition rate of the respective repetitive transmission. The method may include: selecting the first originator node from a group of nodes; iterating over data streams of the plurality of streams whose repetitive transmission is transmitted from the first originator node; and at each iteration: selecting a data stream from the selected originator node, and assigning a phase of the plurality of phases to the selected stream based on a distribution criterion taking into account previously selected data streams and their assignment to a respective phase. The (Continued)

respective repetitive transmission of each stream is scheduled according to the respective phase.

16 Claims, 7 Drawing Sheets

(56) References Cited

U.S. PATENT DOCUMENTS

| | | | |
|---|---|---|---|
| 2007/0116027 A1 | 5/2007 | Ciavaglia et al. | |
| 2008/0181160 A1 | 7/2008 | Dillon | 370/312 |
| 2009/0252172 A1* | 10/2009 | Hare | H04L 47/822 |
| | | | 370/400 |
| 2012/0314785 A1 | 12/2012 | Hua | 375/260 |
| 2016/0183113 A1 | 6/2016 | Dua et al. | 370/329 |
| 2018/0115380 A1 | 4/2018 | Li et al. | |
| 2018/0152970 A1 | 5/2018 | Lee et al. | |
| 2018/0302908 A1* | 10/2018 | Aijaz | H04L 45/28 |
| 2019/0021082 A1 | 1/2019 | Sun et al. | |
| 2020/0120536 A1* | 4/2020 | Prakash | H04W 72/21 |
| 2020/0358717 A1 | 11/2020 | Shah | |
| 2020/0394249 A1 | 12/2020 | Meunier et al. | |

FOREIGN PATENT DOCUMENTS

| | | | | |
|---|---|---|---|---|
| CN | 103036792 A | 4/2013 | | H04L 45/122 |
| CN | 107113770 A | 8/2017 | | G01S 5/14 |
| CN | 107683627 A | 2/2018 | | H04W 72/04 |
| CN | 108923885 | 11/2018 | | H04L 1/00 |
| CN | 110199278 A | 9/2019 | | G06F 17/10 |
| EP | 0178548 A1 | 4/1986 | | H04J 3/16 |
| EP | 1343099 A2 | 9/2003 | | H04L 29/06 |
| EP | 3417576 | 11/2018 | | H04L 12/721 |
| JP | 2007259226 A | 10/2007 | | H04B 7/155 |
| WO | 2017 142994 | 8/2017 | | H04L 12/701 |
| WO | 2020/030164 A1 | 2/2020 | | H04W 72/04 |

OTHER PUBLICATIONS

Nayak Naresh Ganesh et al "Incremental Flow Scheduling and Routing in Time-Sensitive Software-Defined Networks", IEEE Transactions On Industrial Informatics, IEEE Service Center, New York, NY, US, vol. 14, No. 5, May 1, 2018 (May 1, 2018), pp. 2066-2075 (Year: 2018).*

Search Report for International Application No. PCT/EP2019/079676, 3 pages, Jun. 24, 2020.

https://en.wikipedia.org/wiki/Ethernet, 14 pages, Aug. 4, 2019.

https://en.wikipedia.org/w/index.php?title=IEEE_802.3&oldid=1081488864, IEEE 802.3, 6 pages, Apr. 7, 2022.

https://en.wikipedia.org/w/index.php?title=Ethernet&oldid=909327347, 16 pages, Mar. 25, 2022.

Graham, R. L. et al. (1979). "Optimization and Approximation in Deterministic Sequencing and Scheduling: a Survey" (PDF). Proceedings of the Advanced Research Institute on Discrete Optimization and Systems Applications of the Systems Science Panel of NATO and of the Discrete Optimization Symposium. Elsevier. pp. (5) 287-326]; 40 pages.

Abstract zu Lawler (1973): Optimal Sequencing of a single machine sub-ject to precedence constraints. Management Science 19, 544-546; (SdT ist kostenpflichtig, daher nur Abstract); 1 pages, Nov. 28, 2019.

Nayak Naresh Ganesh et al: "Incremental Flow Scheduling and Routing in Time-Sensitive Software-Defined Networks",IEEE Transactions on Industrial Informatics, IEEE Service Center, New York, NY, US, vol. 14, No. 5, May 1, 2018 (May 1, 2018), pp. 2066-2075, XP011683100; 10 pages.

https://en.wikipedia.org/w/index.php?title=Time-Sensitive_Networking&oldid=906080116; 6 pages, Jul. 13, 2019.

https://en.wikipedia.org/w/index.php?title=Time-Sensitive_Networking&oldid=1079006803; 13 pages, Mar. 24, 2022.

Chinese Office Action, Application No. 201980103120.5, 13 pages, May 9, 2024.

U.S. Non-Final Office Action, U.S. Appl. No. 17/773,372, 33 pages, Jun. 12, 2024.

https://en.wikipedia.org/wiki/AMPL; 6 pages, Nov. 1, 2019.

Chinese Office Action, Application No. 201980103119.2, 20 pages, May 30, 2023.

Cheng-yi, Huo et al., "Study of Predecessor Attack in Rerouting Anonymous Communication System," Computer Engineering and Design, vol. 29, No. 5, 3 pages (Chinese w/ English abstract), Mar. 16, 2008.

Liang, Jia-wen et al., "Research on Priority Scheduling Problem Based on the Static Section of FlexRay," Science and Technology Bulletin, 05, DOI: 10.3969/j.issn.100y-1423.2016.06.002, 5 pages (Chinese w/ English abstract), May 31, 2019.

Yang, Yu et al., "Intensive Multi-Channel Network Flow Balancing Scheduling Method Based on Distributed Computing," Science and Technology Bulletin, vol. 35, No. 5, 4 pages (Chinese w/ English abstract), May 31, 2019.

Chinese Office Action, Application No. 201980103119.2, 8 pages, Dec. 22, 2019.

* cited by examiner

SCHEDULING TRANSMISSIONS THROUGH A TELECOMMUNICATION NETWORK

CROSS-REFERENCE TO RELATED APPLICATIONS

This application is a U.S. National Stage Application of International Application No. PCT/EP2019/079676 filed Oct. 30, 2019, which designates the United States of America, the contents of which are hereby incorporated by reference in their entirety.

TECHNICAL FIELD

The present disclosure relates to telecommunication networks. Various embodiments of the teachings herein may include computer-implemented methods for scheduling transmissions of a plurality of data streams through a telecommunication network and/or network scheduling apparatuses for a telecommunication network.

BACKGROUND

Currently, there is a trend of using telecommunication networks also for transmission of time critical data. While telecommunication networks are used for a multitude of different applications, some applications such as applications in the industrial domain or in the domain of vehicle control require transmission of data within certain time constraints. Typically, in an industrial manufacturing environment, a separate telecommunication network is provided for controlling a manufacturing process, which is separate from another telecommunication network used for other data transmissions that are not time critical or not critical for the manufacturing process such as data communication for office communication or process planning, which typically requires a higher bandwidth, but no or at least less strict time constraints.

For telecommunication networks that allow data transmission within certain time constraints, several hard real-time or soft real-time technologies have been developed such as EtherCat or ProfinetIRT. However, using multiple telecommunication networks that are based on different standards may lead to a fragmentation of networks. On the other hand, using one telecommunication network, which allows hard real-time or soft real-time data communication, for different applications may increase the overall costs and/or requirements for (all) nodes of the network.

SUMMARY

The teachings of the present disclosure may be used to improve the reliability of transmitting data through a telecommunication network within certain time constraints and/or to reduce requirements for nodes of such a telecommunication network allowing data transfer—e.g. transmitting of data through the telecommunication network—within certain time constraints, wherein e.g. such nodes of the telecommunication network that have no or a lower requirements for data transfer within a certain time limits have to fulfill less or even no (special) requirements, e.g. besides according to a communication standard such as some of the Ethernet standards. For example, some embodiments include a computer-implemented method (400) for scheduling transmissions of a plurality data streams through a telecommunication network (100, 102, 104), wherein a respective repetitive transmission of each of the plurality of data streams is transmitted, from an originator node (122, 124) of a group of originator nodes (120), in one or more of a plurality of phases according a respective repetition rate of the respective repetitive transmission; the method (400) comprising: (426) selecting a first originator node (122) from the group of originator nodes; (430, 440) iterating over data streams of the plurality of data streams whose repetitive transmission is transmitted from the selected originator node (122, 124) of the group of originator nodes (120) and at each iteration of the iterating (440): (442) selecting, based on a selection criterion, a data stream from the data streams from the selected originator node; and (444) assigning a phase of the plurality of phases to the selected data stream based on a distribution criterion taking into account previously selected data streams and their assignment to a respective phase; and wherein the respective repetitive transmission of each of the data streams is scheduled according to the respective phase.

In some embodiments, the method further comprises: (460) determining, after assigning phases to each data stream of the plurality of data streams, a transmission order for at least one originator node of the group of originator nodes and for at least one phase of the plurality of phases based on the assigning of the phases to each data stream of the plurality of data streams; and (470) scheduling the respective repetitive transmission of each of the data streams, wherein the respective repetitive transmission starts at the respective phase assigned to the respective data stream and is repetitively transmitted after a number of phases equal to the respective repetition rate, and wherein within each of the phases the repetitive transmissions from the same originator node (122, 124) are transmitted according to the transmission order.

In some embodiments, the method further comprises (470) scheduling the respective repetitive transmission of each of the data streams, wherein the respective repetitive transmission starts at the respective phase assigned to the respective data stream and is repetitively transmitted after a number of phases equal to the respective repetition rate, and wherein within each of the phases the repetitive transmissions from the same originator node (122, 124) are transmitted according to a transmission order, wherein the transmission order is determined (460) by an order of the assigning of a respective phase to each one of the data streams.

In some embodiments, the selection criterion is based on the respective repetition rate of the respective repetitive transmission and a traveling duration of the respective repetitive transmission, and the method further comprises: (436) sorting data streams from the plurality of data streams whose repetitive transmission is transmitted from the selected originator node by their respective repetition rate in ascending order; and (434) further sorting the sorted data streams having the same repetition rate by their respective traveling duration in descending order; wherein the iterating and the selecting of a data stream is performed by iterating through the sorted data streams.

In some embodiments, the selection criterion is selected from a group comprising: the respective repetition rate, a duration of the respective repetitive transmission, a traveling duration of the respective repetitive transmission, a length of a path used form the respective repetitive transmission, an amount of data of the respective repetitive transmission or a combination thereof.

In some embodiments, the group (120) of originator nodes (122, 124) comprises the first originator node (122) and a second originator node (124), the method further comprising: (426) selecting the second originator node (124), after selecting the first originator node and assigning phases to the data streams whose repetitive transmission is transmitted from the second originator node (124); (430, 440) iterating over data streams of the plurality of data streams whose repetitive transmission is transmitted from the second originator node of the group of originator nodes for assigning phases to them.

In some embodiments, the group (120) of originator nodes further comprises one or more further originator nodes; and wherein each originator node (122, 124) of the group of originator nodes is the selected (426) and the iterating (430, 440) is performed for each of the originator nodes (122, 124), wherein an order of the selecting (426) of each of the originator nodes (122, 124) is randomly determined (425); and wherein at least the selecting in a randomly determined order and the iterating is repeated (418) at least for a predetermined number of times until (416) a scheduling constraint is met.

In some embodiments, the telecommunication network (100, 102, 104) comprises, for each data stream of the plurality of data streams, a respective path through the telecommunication network, the respective path being used for the respective repetitive transmission of the respective data stream; and the method further comprises: (424) determining, for each respective path, whether the respective path comprises a shared network link (130, 132, 134, 136, 138), wherein this shared network link is also part of a path of another data stream of the plurality of streams; and wherein a measure of interference for a phase of the plurality of phases between the selected data stream, being selected at an iteration of the iterating, and any data streams, whose repetitive transmissions are transmitted from any previously selected originator node within this phase and whose paths comprise a shared network link being shared with the path of the selected data stream, is the sum over a respective duration of each of the repetitive transmissions.

In some embodiments, the distribution criterion is a measure of a cumulative sending delay at the selected originator node and an interference between the selected data stream and any data streams whose repetitive transmissions are transmitted from any previously selected originator nodes (122, 124).

In some embodiments, the iterating further comprises: (454) determining, after assigning the respective phase to the selected data stream in an iteration of the iterating, a measure of a cumulative sending delay at the selected originator node for the respective phase taking into account a respective duration of the respective transmission of the selected data stream and of each of the previously selected data streams, whose repetitive transmissions are transmitted from the selected originator node within this phase; and (448) determining, when assigning (444) the respective phase to the selected data stream, a measure of interference between the selected data stream and any data streams whose repetitive transmissions are transmitted from any previously selected originator nodes for each (446, 410) phase of the plurality of phases being smaller or equal to the respective repetition rate of the repetitive transmission of the selected data stream and assigning (452) the phase to the selected data stream that has the smallest sum of the measure of interference and the measure of the cumulative sending delay, if the cumulative sending delay has been determined in a previous iteration of the iterating for the selected originator node.

In some embodiments, the telecommunication network (100, 102, 104) is a time sensitive network, and wherein the transmissions are partitioned into transmission cycles, the transmission cycles having a predetermined duration, and wherein the transmission cycles are cyclically associated with one of the plurality of phases.

As another example, some embodiments include a computer-implemented method for scheduling transmissions of a plurality data streams through a telecommunication network (100, 102, 104), wherein a respective repetitive transmission of each of the plurality of data streams is transmitted, from an originator node (122, 124) of a group of originator nodes (120), in one or more of a plurality of phases according a respective repetition rate of the respective repetitive transmission; the method comprising: determining a phase assignment for each data stream of the plurality of data streams, wherein a respective phase of the plurality of phases is assigned to each respective data stream of the plurality of data streams; and (460) determining, after assigning phases to each data stream of the plurality of data streams, a transmission order of at least one group of repetitive transmissions for at least one originator node of the group of originator nodes and for at least one phase of the plurality of phases based on the phase assignments for each data stream of the plurality of data streams.

In some embodiments, the determining of the transmission order takes into account an order criterion such as a worst-case arrival time of repetitive transmissions scheduled for being transmitted by the at least one originator node within the at least one phase according to their phase assignments and repetition rates.

In some embodiments, each respective repetitive transmission of the at least one group is from a respective data stream from the at least one originator node; the at least one phase has been assigned to the respective data stream or another phase has been assigned to the respective data stream such that a number of the another phase and an integer multiple of the respective repetition rate of the respective repetitive transmission is equal to a number of the at least one phase; and the determining of the transmission order is performed by sorting the at least one group of repetitive transmissions taking into account a respective worst-case arrival time of each repetitive transmission of the at least one group.

As another example, some embodiments include a network scheduling apparatus (300) for a telecommunication network (100), wherein a respective repetitive transmission of each of a plurality of data streams is transmitted, from an originator node of a group of originator nodes (120) of the telecommunication network, in one or more of a plurality of phases according a respective repetition rate of the respective repetitive transmission; the network scheduling apparatus comprising a data processing apparatus (340) adapted to: select a first originator node from the group of originator nodes; iterate over data streams of the plurality of data streams whose repetitive transmission is transmitted from the selected originator node of the group of originator nodes and at each iteration: to select, based on a selection criterion, a data stream from the data streams from the selected originator node; and to assign a phase of the plurality of phases to the selected data stream based on a distribution criterion taking into account previously selected data streams and their assignment to a respective phase; and wherein the respective repetitive transmission of each of the data streams is scheduled according to the respective phase.

BRIEF DESCRIPTION OF THE DRAWINGS

The above and other embodiments, modifications, further improvements, elements, features, steps and characteristics of the teachings of the present disclosure will be more apparent from the following detailed description of exemplary embodiments and the appended figures. When not stated otherwise or following otherwise from the context, like reference signs referred to corresponding apparatuses, elements or features of the exemplary embodiments and throughout the figures.

DETAILED DESCRIPTION

Figure 1:
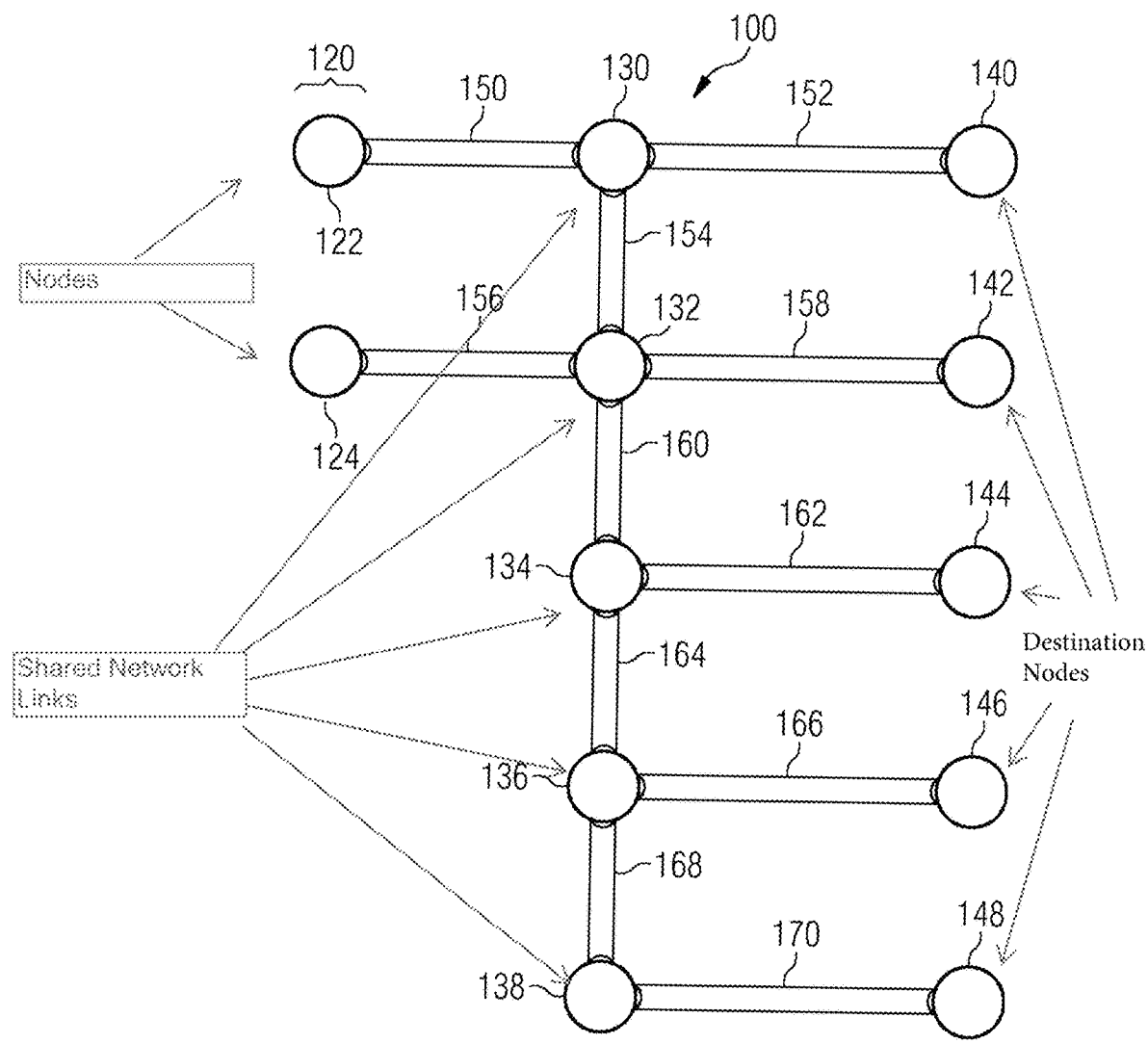
FIG. 1 schematically illustrates a network scheduling apparatus incorporating teachings of the present disclosure in a scenario with a telecommunication network.

The teachings of the present disclosure may be implemented in a computer-implemented method for scheduling transmissions of a plurality of data streams through a telecommunication network. By the scheduling, the telecommunication network is configured, such that a respective repetitive transmission of each of the plurality of data streams is transmitted, from an originator node of a group of originator nodes, in one or more of a plurality of phases according a respective repetition rate of the respective repetitive transmission. The method comprises selecting a first originator node from the group of originator nodes. The method further comprises iterating over data streams of the plurality of data streams whose repetitive transmission is transmitted from the selected originator node of the group of originator nodes, wherein at each iteration of the iterating a data stream from the data streams from the selected originator node is selected based on a selection criterion, and wherein at each iteration a phase of the plurality of phases is assigned to the selected data stream based on a distribution criterion taking into account previously selected data streams and their assignment to a respective phase. Moreover, the respective repetitive transmission of each of the data streams is scheduled according to the respective phase.

A potential advantage of scheduling the respective repetitive transmission in accordance with the respective phase of each respective repetitive transmission for each of the plurality of data streams may be that this scheduling is a deterministic scheduling, whereby reliability of data transfer and/or of transmitting the repetitive transmissions through the telecommunication network—e.g. from an originator node to e.g. a destination node—may be improved. Moreover, the, e.g., deterministic scheduling may facilitate guaranteeing data transfer—e.g. transmitting the data by one of the repetitive transmissions at the originator node and arrival of the repetitive transmission at the destination node—within certain time constraints such as a predetermined maximum arrival time for the data of the repetitive transmission or a predetermined number of transmission cycles associated with a phase.

A potential advantage of iteratively assigning the respective phase based on the distribution criterion taking into account previously selected data streams in their assignment to a respective phase may particularly be, that the respective selected data stream and the previously selected data streams may be distributed over the plurality of phases in a computationally efficient manner—e.g., depending on an implementation, in the order of $O(N^2)$, or $O(N*P)$, or $O(N*\log(P))$ with N being the number of data streams and P being the number of phases—and/or with a predetermined/deterministic runtime, whereby, e.g., bandwidth of the telecommunication network and/or processing time may be utilized in a more efficient manner, such that a failure to meet time constraints due to a high number of repetitive transmissions or a huge amount of data transfer within one phase—while a number of repetitive transmissions or an amount of transferred data by these repetitive transmissions is lower in other phases—may be avoided and/or such that bandwidth and/or processing time remains for other data transfer such as data transmissions with a lower priority than the repetitive transmissions of the data streams. Moreover, computational efficiency may facilitate implementing the computer-implemented method in and/or performing it by a network scheduling apparatus with limited computing resources such as a gateway node or a network controller, whereby, e.g., adapting a telecommunication network for the computer-implemented method and/or operating a telecommunication network with such a scheduling may be simplified.

By iteratively selecting the respective data stream based on the selection criterion a transmission order may be taken into account, when iteratively assigning the phases to the data streams, such that the assignment of the phases to the data streams and the transmission order—e.g. a preliminary or a final transmission order—may be determined simultaneously. Moreover, the transmission order may influence a solution for the assignment of the phases and vice versa, and hence, simultaneously determining both may improve a solution for the phase assignment and/or the transmission order, whereby, e.g., certain time constraints for data transfer by the repetitive transmissions may be met and/or (more) bandwidth of the telecommunication network and/or processing time remains for other data transfer.

As another example, the teachings of the present disclosure may be implemented in a computer-implemented method for scheduling transmissions of a plurality of data streams through a telecommunication network. By the scheduling, the telecommunication network is configured, such that a respective repetitive transmission of each of the plurality of data streams is transmitted, from an originator node of a group of originator nodes, in one or more of a plurality of phases according a respective repetition rate of the respective repetitive transmission. The method may comprise determining a phase assignment for each data stream of the plurality of data streams, wherein a respective phase of the plurality of phases is assigned to each respective data stream of the plurality of data streams. The method may comprise determining, after assigning phases to each data stream of the plurality of data streams, a transmission order of at least one group of repetitive transmissions for at least one originator node of the group of originator nodes and for at least one phase of the plurality of phases based on the phase assignments for each data stream of the plurality of data streams.

The embodiments, implementations, advantageous modifications, further modifications and further improvements as described in detail in connection with the methods as well as potential benefits and advantages also apply correspondingly to the network scheduling apparatus incorporating teachings of the present disclosure. Hence, in some embodiments, the phase assignment is determined by performing a method as described herein. Likewise, in some embodiments, a transmission order is determined by a method as described herein. This may synergistically allow to further improve the scheduling of the transmissions, wherein, e.g., during phase assignment a preliminary transmission order is determined when assigning phases to the data streams, wherein the transmission order is further optimized—e.g. by sorting.

As another example, the teachings of the present disclosure may be implemented in a network scheduling apparatus for a telecommunication network, wherein a respective repetitive transmission of each of a plurality of data streams is transmitted, from an originator node of a group of originator nodes of the telecommunication network, in one or more of a plurality of phases according a respective repetition rate of the respective repetitive transmission. The network scheduling apparatus may comprise a data processing apparatus adapted to select a first originator node from the group of originator nodes. The data processing apparatus is further adapted to iterate over data streams of the plurality of data streams whose repetitive transmission is transmitted from the selected originator node of the group of originator nodes. Furthermore, the data processing apparatus is adapted to select, at each iteration and based on a selection criterion, a data stream from the data streams from the selected originator node. Furthermore, the data processing apparatus is adapted to assign, at each iteration, a phase of the plurality of phases to the selected data stream based on a distribution criterion taking into account previously selected data streams and their assignment to a respective phase. Moreover, the respective repetitive transmission of each of the data streams is scheduled according to the respective phase.

The embodiments, implementations, advantageous modifications, further modifications and further improvements as described in detail in connection with the methods described herein as well as potential benefits and advantages also apply correspondingly to the network scheduling apparatus incorporating teachings of the present disclosure. Hence, in some embodiments, the network scheduling apparatus is adapted to perform a method as described herein, or, respectively, some embodiments of the methods are performed by a network scheduling apparatus as described herein.

As another example, some embodiments include a network scheduling apparatus for a telecommunication network, wherein a respective repetitive transmission of each of a plurality of data streams is transmitted, from an originator node of a group of originator nodes of the telecommunication network, in one or more of a plurality of phases according a respective repetition rate of the respective repetitive transmission. The network scheduling apparatus comprises a data processing apparatus adapted to determine a phase assignment for each data stream of the plurality of data streams, wherein a respective phase of the plurality of phases is assigned to each respective data stream of the plurality of data streams. The data processing apparatus is further adapted to determine, after assigning phases to each data stream of the plurality of data streams, a transmission order of at least one group of repetitive transmissions for at least one originator node of the group of originator nodes and for at least one phase of the plurality of phases based on the phase assignments for each data stream of the plurality of data streams.

The embodiments, implementations, advantageous modifications, further modifications and further improvements as described in detail in connection with the methods and systems described herein as well as potential benefits and advantages also apply correspondingly to the network scheduling apparatus incorporating teachings of the present disclosure. Hence, in some embodiments, the network scheduling apparatus is adapted to perform a method as described herein, or, respectively, some embodiments of the methods described herein are performed by a network scheduling apparatus incorporating teachings of the present disclosure.

The above summary is merely intended to give a short overview over some features of some embodiments and implementations and is not to be construed as limiting. Other embodiments may comprise other features than the ones explained above.

In the following, various embodiments are described in detail with reference to the appended figures. It is to be understood that the following description of embodiments is not to be taken in a limiting sense. The scope of the disclosure is not intended to be limited by the embodiments described hereinafter or by figures, which are taken to be illustrative only. The figures are to be regarded as being schematic representations and elements illustrated in the figures, which are not necessarily shown to scale. Rather, the various elements are represented such that their function and their general purpose become apparent to a person skilled in the art. Any connection or coupling between functional blocks, devices, components or other physical or functional units shown in the figures or described herein may also be implemented as an indirect connection or coupling. A coupling between components may be established over a wireless connection. Functional blocks may be implemented in hardware, firmware, software or a combination thereof.

FIG. 1 schematically illustrates a network scheduling apparatus 300 incorporating teachings of the present disclosure in conjunction with a telecommunication network 100. Moreover, telecommunication network 100 or parts thereof may comprise embodiments of the teachings herein, e.g. a system comprising one or more originator nodes of the telecommunication network and a network scheduling apparatus, the network scheduling apparatus adapted for scheduling data transmissions originating from the originator nodes.

In some embodiments, the network scheduling apparatus 300 comprises at least one communication interface 320 for providing a scheduling of transmissions of a plurality of data streams in the telecommunication network 100. Furthermore, the network scheduling apparatus 300 comprises a data processing apparatus 340 adapted to determine the scheduling.

In some embodiments, the telecommunication network 100 comprises a group 120 of originator nodes 122, 124, and destination nodes 140, 142, 144, 146, 148, wherein the originator nodes 122, 124 are data connected via network links 150, 152, 154, 156, 158, 160, 162, 164, 166, 168, 170 and further network nodes 130, 132, 134, 136, 138 of the telecommunication network 100 to the destination nodes 140, 142, 144, 146, 148. In some implementations, one or more of the originator nodes 120 are industrial apparatuses, e.g. for a manufacturing process, such as CNC machines, robots, conveyors, lamps, or windmills. In some implementations, one or more of the destination nodes 140-148 are industrial apparatuses, e.g. for a manufacturing process, such as CNC machines, robots, conveyors, lamps, or windmills.

In some embodiments, one or more of the originator nodes 120 and one or more of the destination nodes 140-148 are industrial apparatuses, e.g. for a manufacturing process, such as CNC machines, robots, conveyors, lamps, or windmills. In some implementations, a first industrial apparatus of the originator nodes 120 is adapted to control, via the telecommunication network 100—e.g. via some of the network nodes 130-138 and network links 150-170—, a second industrial apparatus of the destination nodes 140-148. Furthermore, the second industrial apparatus may be adapted to provide a sensor signal—e.g. for a feedback loop for controlling the second industrial apparatus—, via the telecommunication network 100, to the first industrial apparatus. Hence, e.g., with regard to the sensor signal the first and the second industrial apparatus change the roles in relation to the telecommunication network 100, wherein, when providing the sensor signal, the second industrial apparatus is an originator node and the first industrial apparatus is a destination node.

In some embodiments, in which the group of originator nodes 120 is data connected to the destination nodes 140-148 via the network links 150-170, the telecommunication network 100 further comprises further network nodes 130-138, the network nodes respectively being adapted to provide a data connection between two or more of the network links 150-170. In some implementations, a network node of the of the further network nodes 130-138 comprises or consists of a gateway node.

In some embodiments, the telecommunication network 100 is a wired network. Moreover, in some implementations, the telecommunication network 100 is according to Ethernet standards such as IEEE 802.3. Furthermore, in some implementations, some of the (further) network nodes are gateway nodes. For a network according to Ethernet standards, the gateway nodes are implemented as network switches, in some implementations.

In some embodiments, a first originator node 122 of the group of originator nodes 120 is data connected to the destination node 140 by a path through the telecommunication network 100. As illustrated in FIG. 1, the path comprises the network link 150 and the network link 152, and further comprises the network node 130, wherein the network node 130 is adapted to provide a data connection between the network link 150 and the network link 152, and wherein the first originator node 122 is data connected to the network node 130 via the network link 150 and the network node 130 is data connected to the destination node 140 via the network link 152.

Likewise, the first originator node 122 is data connected to the destination node 142 by a path through the telecommunication network 100, the path comprising the network link 150, the network node 130, the network node 132, which is data connected to the network node 130 via the network link 154 of the path, and the network link 158.

As illustrated in FIG. 1, the network link 150 is part of the path connecting the first originator node 122 to the destination node 140 and as part of the path connecting the first originator node 122 to the destination node 142. Hence, the network link 150 is a shared network link.

Moreover, the first originator node 122 is likewise data connected to the destination node 144 via a path comprising the further network nodes 130, 132, 134 and the network links 150, 154, 160, 162. Furthermore, the first originator node 122 is data connected to the destination node 146 via a path comprising the further network nodes 130, 132, 134, 136 and the network links 150, 154, 160, 164, 166. Furthermore, the first originator node 122 is data connected to the destination node 148 via a path comprising the further network nodes 130, 132, 134, 136, 138 and the network links 150, 154, 160, 164, 168, 170.

Likewise, the second originator node 124 of the group of originator nodes 120 is data connected to the destination node 140 by a path through the telecommunication network 100. As illustrated in FIG. 1, the path comprises the network link 156, the network link 154 and the network link 152, and further comprises the network nodes 130 and 132, wherein the network node 132 is adapted to provide a data connection from the network link 156 to the network link 154 and the network node 130 is adapted to provide a data connection from the network link 154 to the network link 152, and wherein the second originator node 124 is data connected to the network node 132 via the network link 156 and the network node 130 is data connected to the destination node 140 via the network link 152.

As can be seen from FIG. 1, the network link 154 may be adapted to provide a data connection from the network node 130 to the network node 132—e.g. for the path for data connecting the first originator node 122 to the destination node 142—and is adapted to provide a data connection from the network node 132 to the network node 130—e.g. for the path for data connecting the second originator node 124 to the destination node 140. In some implementations, transmissions in one of the directions—e.g. from the network node 130 to the network node 132—may influence transmissions in another one of the directions—e.g. from the network node 132 to the network node 130.

In such implementations, the network link 154 may be adapted and/or may operate in a half-duplex mode, wherein—in particular—data is transmitted, at one time—only into one of the directions, while at another time data may be transmitted into the respective opposite direction. In such implementations, the network link 154 is a shared network link with regard to the paths comprising this network link—e.g. even if the paths use the network link for different directions. In some implementations, the network link may be adapted and/or may operate in a full-duplex mode, wherein transmission of data in one direction along this network link does not or at least does not significantly influence transmission of data into another direction, e.g. the opposite direction. In such implementations, this network link is not a shared network link with regard to two paths comprising/using this network link for two different directions of data transmission.

Moreover, the second originator node 124 is likewise data connected to the destination node 142 via a path comprising the network node 132 and the network links 156 and 158, wherein the network node 132 is further adapted to provide a data connection from the network link 156 to the network link 158. Furthermore, the second originator node 124 is data connected to the destination node 144 via a path comprising the further network nodes 132, 134 and the network links 156, 160, 162. Furthermore, the second originator node 124 is data connected to the destination node 146 via a path comprising the further network nodes 132, 134, 136 and the network links 156, 160, 164, 166. Furthermore, the second originator node 124 is data connected to the destination node 148 via a path comprising the further network nodes 132, 134, 136, 138 and the network links 156, 160, 164, 168, 170.

As can be seen from FIG. 1, the network link 160 is part of the path from the first originator node 122 to the destination node 144 and as part of the path from the second originator node 124 to the destination node 144, wherein for both paths the network link 160 is adapted to provide a data connection from network node 132 to network node 134 and, thus for transmission of data in the same direction—e.g. from network node 132 to network node 134. Hence, network link 160 is a shared network link, e.g. also for implementations with a half-duplex mode as well as implementations with a full-duplex mode provided by the network link 160. Likewise, the network links 152, 156, 158, 162, 164, 166, 168, 170 are shared network links with regard to the respective paths comprising them.

In some embodiments, the network scheduling apparatus 300 is adapted to provide, at least to the group of originator nodes 120, the scheduling of the transmissions by means of the communication interface 320 and the telecommunication network 100—e.g. by providing an scheduling signal. In some implementations, the network scheduling apparatus 300 is directly data connected to the group of originator nodes via the telecommunication network 100. This may allow to use the telecommunication network 100 for both, data transmission between originator nodes and destination nodes as well as data transmission—i.e. in particular for scheduling—between the network scheduling apparatus 300 and (at least) the group of originator nodes, whereby a complexity of a network structure including the telecommunication network 100 may be reduced. In some implementations, the network scheduling apparatus 300 comprises or consists of a gateway node.

In some embodiments, as illustrated in FIG. 1, the network scheduling apparatus 300 is adapted to provide, at least to the group of originator nodes 120, the scheduling of the transmissions by means of the communication interface 320 and by an additional network or communication path—i.e. by providing a scheduling signal. In some implementations, the network scheduling apparatus 300 is indirectly data connected to the group of originator nodes via the telecommunication network 100 or the network scheduling apparatus 300 is separately data connected to the plurality of originator nodes. In some of such implementations, the additional network or communication path may be a wireless communication path. In some embodiments, the additional network or communication path may be an additional wired network. This may allow to separate data transmission between originator nodes and destination nodes from data transmission—i.e. in particular for scheduling—between the network scheduling apparatus 300 and (at least) the group of originator nodes, whereby a load on the telecommunication network 100 may be reduced and/or a potential disturbance may be mitigated.

In some embodiments, the network scheduling apparatus 300 is a network controller.

Figure 2:
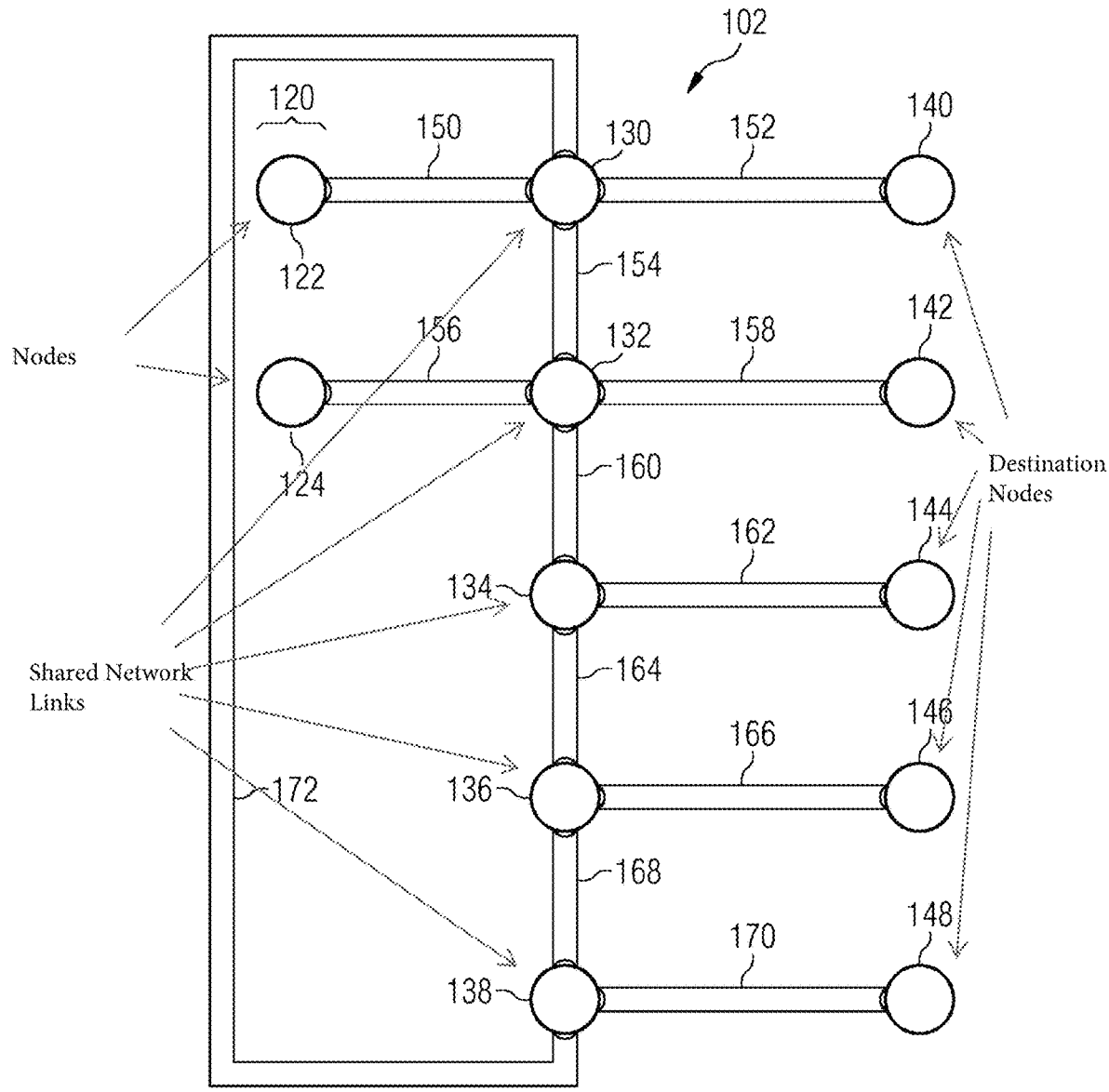
FIG. 2 schematically illustrates a scenario with another telecommunication network.

In FIG. 2 another telecommunication network 102 is schematically illustrated. Moreover, telecommunication network 102 or parts thereof may also incorporate teachings of the present disclosure, e.g. a system comprising one or more originator nodes of the telecommunication network and a network scheduling apparatus or a gateway node, the network scheduling apparatus or gateway node adapted for scheduling data transmissions originating from the originator nodes.

In some embodiments, the telecommunication network 102 is similar to the telecommunication network 100, which has been described with reference to FIG. 1. Also telecommunication network 102 comprises the group 120 of originator nodes 122, 124, the destination nodes 140-148 and the network nodes 130-138 as well as the network links 150-170. Moreover, the telecommunication network 102 comprises a network link 172, wherein the network node 130 and the network node 138 are data connected via the network link 172.

As can be seen from FIG. 2, the network node 130 and the network node 138 are also data connected via the network links 154, 160, 164, 168. In some implementations, the network link 172 may be implemented as a unidirectional network link adapted for transmitting data from the network node 130 to the network node 138—but not in an opposite direction—or vice versa. Thereby, in conjunction with the network links 154, 160, 164, 168, the telecommunication network 102 may comprise a ring structure along the network links 154, 160, 164, 168 and 172. In some alternative implementations, the network link 172 may be implemented as a bidirectional network link—e.g. with full-duplex or half-duplex mode. Therefore, for a data connection from the first originator node 122 to the destination node 148 there is a path through the telecommunication network 102 comprising the network link 150, the network node 130, the network link 172, the network node 138 and the network link 170 as well as a path through the telecommunication network 102 comprising the network link 150, the network node 130, the network link 154, the network node 132, the network link 160, there network node 134, the network link 164, there network node 136, the network link 168, the network node 138 and the network link 170. Hence, the telecommunication network 102 comprises a loop, the loop e.g. comprising the network links 172, 168, 164, 160 and 154.

Compared to the telecommunication network 102, the telecommunication network 100 of FIG. 1 does not comprise a loop and/or has a tree-type topology. Moreover, for a telecommunication network with a tree-type topology, a path between two of its nodes/network nodes, e.g. from an originator node to a destination node, is unique. Therefore, the path between the two nodes may unambiguously be determined based on data—such as a configuration signal—indicating the two nodes. For a telecommunication network not having a tree-type topology and e.g. having a loop such as a telecommunication network 102, there may be multiple paths from one node of this telecommunication network to another node of this telecommunication network.

Figure 3:
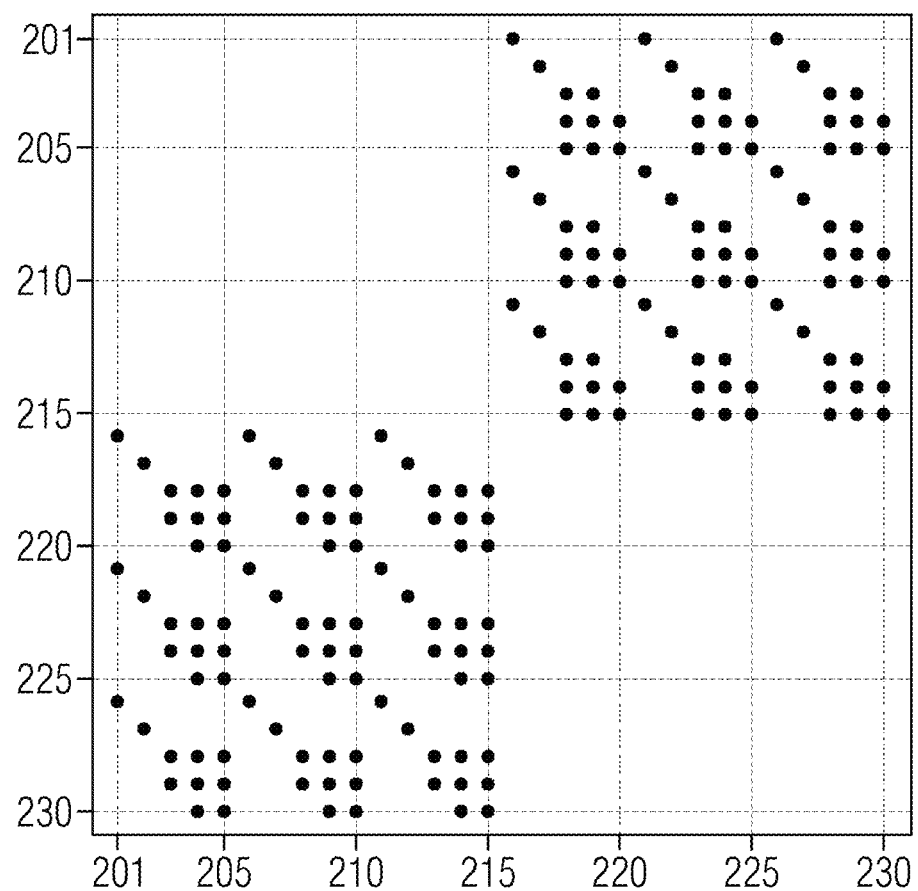
FIG. 3 schematically illustrates an interference matrix of a scenario with the telecommunication network of FIG. 1 for elucidating a computer-implemented method for scheduling transmissions of a plurality of data streams incorporating teachings of the present disclosure.

In FIG. 3 an interference matrix of a scenario with the telecommunication network 100 described with reference to FIG. 1 is schematically illustrated for elucidating a computer-implemented method for scheduling transmissions of a plurality of data streams incorporating teachings of the present disclosure.

In some embodiments, the scenario comprises thirty data streams 201-230 as the plurality of data streams (also called "streams" for brevity). The first originator node 122 is adapted to communicate with the destination nodes 140-148, wherein it sends messages—e.g. repetitive transmissions—to the destination nodes 140-148 with a respective repetition rate of 1, 2 and 4, i.e. RR=1, 2, or 4, for each of the destination nodes 140-148. Hence, the first originator node 122 is adapted to transmit a repetitive transmission of each of the fifteen data streams 201-216 to a respective one of the destination nodes. Likewise, the second originator node 124 is adapted to communicate with the destination nodes 140-148, wherein it transmits a respective repetitive transmission of one of the fifteen data streams 216-230 to a respective one of the destination nodes with a respective repetition rate of 1, 2 or 4.

Furthermore, in an exemplary embodiment, the originator nodes 122 and 124 are each a controller device such as a ProfinetIRT-controller. Furthermore, since this network 100 has a tree-type topology, the paths between the given sender—e.g. the originator node 122 or 124—and receiver addresses—e.g. the destination node 140, . . . , or 148—are unique and may be efficiently determined.

For further elucidating the scenario and/or the computer-implemented method and/or for testing and implementation of the computer-implemented method based on a scenario, a respective duration of the repetitive transmission each one of the plurality of data streams may be randomly chosen between a predetermined minimum transmission duration and a predetermined maximum transmission duration. For example, the respective durations may be determined based on respective amounts of data for each repetitive transmission and a bandwidth of the network, e.g. 1 Gb/s.

After such randomly choosing of transmission durations, the scenario may be summarized with the following table:

| Data stream | Originator node | Destination node | Repetition rate (RR) | Transmission Duration (µs) | Path length |
|---|---|---|---|---|---|
| 201 | 122 | 140 | 1 | 9.4 | 2 |
| 202 | 122 | 142 | 1 | 5.9 | 3 |
| 203 | 122 | 144 | 1 | 3.3 | 4 |
| 204 | 122 | 146 | 1 | 10.3 | 5 |
| 205 | 122 | 148 | 1 | 0.9 | 6 |
| 206 | 122 | 140 | 2 | 3.8 | 2 |
| 207 | 122 | 142 | 2 | 10.2 | 3 |
| 208 | 122 | 144 | 2 | 4.2 | 4 |
| 209 | 122 | 146 | 2 | 3.6 | 5 |
| 210 | 122 | 148 | 2 | 1.7 | 6 |
| 211 | 122 | 140 | 4 | 9.7 | 2 |
| 212 | 122 | 142 | 4 | 1.9 | 3 |
| 213 | 122 | 144 | 4 | 3.8 | 4 |
| 214 | 122 | 146 | 4 | 9.5 | 5 |
| 215 | 122 | 148 | 4 | 5.5 | 6 |
| 216 | 124 | 140 | 1 | 6.7 | 3 |
| 217 | 124 | 142 | 1 | 6.3 | 2 |
| 218 | 124 | 144 | 1 | 7.5 | 3 |
| 219 | 124 | 146 | 1 | 0.8 | 4 |
| 220 | 124 | 148 | 1 | 5.8 | 5 |
| 221 | 124 | 140 | 2 | 0.8 | 3 |
| 222 | 124 | 142 | 2 | 8.8 | 2 |
| 223 | 124 | 144 | 2 | 3.9 | 3 |
| 224 | 124 | 146 | 2 | 9.0 | 4 |
| 225 | 124 | 148 | 2 | 3.0 | 5 |
| 226 | 124 | 140 | 4 | 6.3 | 3 |
| 227 | 124 | 142 | 4 | 9.9 | 2 |
| 228 | 124 | 144 | 4 | 1.0 | 3 |
| 229 | 124 | 146 | 4 | 1.0 | 4 |
| 230 | 124 | 148 | 4 | 0.7 | 5 |

In the above table, a travelling duration—or traveling time—of a last-bit of a repetitive transmission is calculated, for each one of the plurality of data streams, based on the respective path length, wherein the respective path length may be based on a number of hops—e.g. a number of network nodes—and/or a number of network links on the repetitive transmission's path, wherein the path length is multiplied by the maximal bridge delay of, e.g., 2 µs (including the preemption delay of lower priority frames), plus the transmission duration, which may be calculated by a time span needed to send the whole repetitive transmission on the respective network link—e.g. for the first originator node 122 the network link 130—. Hence, in an implementation, where or network links and possibly network nodes provide the same bandwidth—e.g. the network bandwidth—, the transmission duration may be calculated by (amount of data of the respective repetitive transmission)/ (network bandwidth).

The delay by cables, e.g. the network links, may be taken into account as an additional hop, e.g. as additional length of the path, e.g. additional 2 µs, or may be neglected.

When or before performing phase-allocation—e.g. phase-assignment, e.g. assigning a phase to each one of the plurality of data streams—and ordering of repetitive transmissions—e.g. determining a transmission order for each repetitive transmission—, and may be checked whether there is any possible interference between the thirty data streams. Therefore, a matrix of the dimension StreamNumber×StreamNumber (30×30 in the example scenario) is constructed as shown in FIG. 3, wherein it is determined whether the path of a stream "i" has an overlap—e.g. a shared network link and/or a shared network node—with path of stream "j" which does not originate from the same output port at a sender. If there is no overlap, a "0" is written at the element "ij" of the matrix and when there is an overlap "1" is written. Such a matrix is illustrated in FIG. 3, wherein "0" entries are white and "1" entries have black color. For example, it can be seen from FIG. 1 and the above table, that the stream 201 (originating from the originator node 122) has potential interference with streams 216, 221, 226 originating from the originator node 124.

Phase-assignment and ordering of repetitive transmissions is provided in some embodiments as a single optimization problem, or in some other embodiments as two separate optimization problems. In the following, a heuristic algorithm, which intends to address sequentially sets of streams, each said originating from the same originator node (and its same output port). Thus, a phase-assignment determined for previous set of streams may be taken into account when a phase-assignment is determined for a later set of streams. So, with the above described scenario, there are two sets of streams, the first one originating from the same originator node 122 and the second set originating from the originator node 124. It is to be understood, that the heuristic algorithm may also be used for one set of data streams, wherein, e.g., all data streams originate from one originator node, wherein, e.g., the group of originator nodes only one originator node. Also it is to be understood, that the heuristic algorithm may also be used for a group of originator nodes comprising more than two originator nodes, and thus, for more than two sets of data streams.

Figure 4:
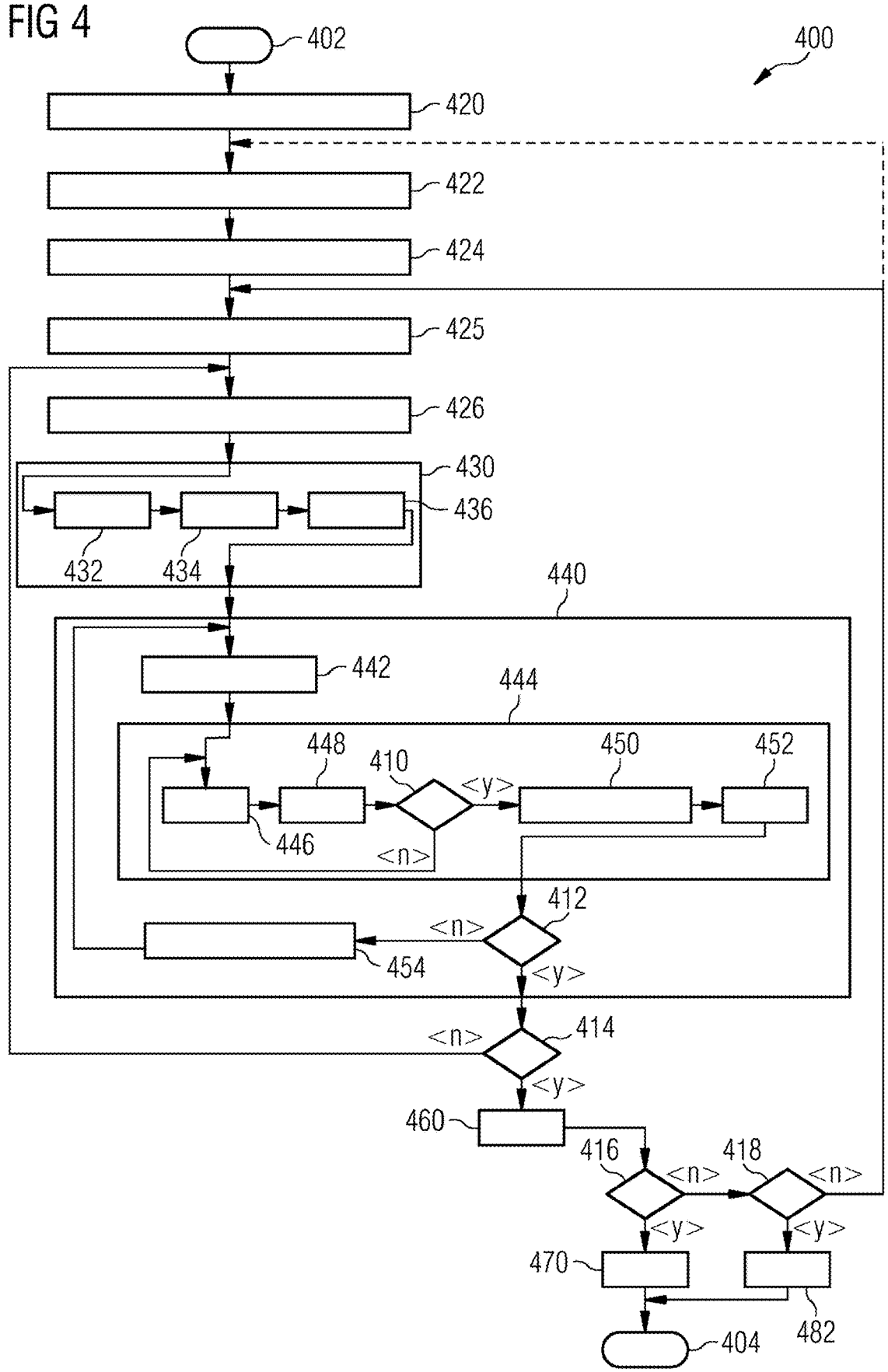
FIG. 4 represents a flowchart of a computer-implemented method incorporating teachings of the present disclosure.

FIG. 4 shows a flowchart of a computer-implemented method 400 for scheduling transmissions of a plurality of data streams through a telecommunication network, the method 400 incorporating teachings of the present disclosure. Moreover, in some implementations, the method 400 is performed by a network scheduling apparatus or a system, the system comprising a network scheduling apparatus and one or more originator nodes, according to an embodiment of the invention.

In some embodiments, the method 400 comprises the method conditions 410, 412, 414, 416 and 418, and further comprises the method steps 420, 422, 424, 425, 426, 430, 432, 434, 436, 440, 442, 444, 446, 448, 450, 452, 454, 460, 470 and 480. The method starts at the start of the method 402 and ends at the end of the method 404. Furthermore, one or more of the method steps, in particular a sequence of method steps and/or the whole method 400 may repeatedly be performed.

In some embodiments, the transmissions are partitioned into transmission cycles, wherein the transmission cycles have a predetermined length in time. For each of the plurality of data streams, a respective repetitive transmission has a respective repetition rate. The respective repetitive transmission of each of the plurality of data streams is transmitted by an originator node at a transmission cycle of the transmission cycles associated with a phase of a plurality of phases and is repetitively transmitted with a respective time interval between a starting of adjacent ones of respective repetitive transmissions, wherein the respective time interval is determined by the predetermined length in time of the transmission cycles multiplied by the respective repetition rate.

In some implementations, the telecommunication network is a time sensitive network. In some other implementations the telecommunication network may at least support time synchronization for transmitting transmissions according to transmissions cycles and/or phases, wherein the transmission cycles/phases are determined based on a synchronized time. For example, in a scenario with a time sensitive network, the repetition rates may also be called reduction rates or reduction ratios and the transmission cycles may also be called network cycles.

In some embodiments, sending of information—in particular, transmitting of repetitive transmissions—in a time sensitive network is cyclic, i.e. the messages—e.g. frames or repetitive transmissions—are resent in regular time intervals, wherein transmission cycles with such a time interval are each one associated with one of a set of phases, the phases of the set of phases being separated a respective time interval. These time intervals are defined to be integer multiples of the network cycle "Tn", and they determine the "Reduction Ratio (RR)" as a characteristic of every frame/repetitive transmission/data stream.

So, RR=1 implies that a frame/repetitive transmission is sent in every network cycle/phase, i.e. that the interval between its two sending is exactly one Tn. In a general case, the interval between two sending of the same repetitive transmissions of a data stream is equal to (RR*Tn). A consequence of a RR=K>1, is that the stream can be sent the first time in any of K network cycles/phases. E.g. a stream with RR=2 could be initially sent either in the first network cycle—associated with the first phase—or the second network cycle—associated with the second phase—and then resent every 2*Tn after that, e.g. in all (odd) network cycles associated with the first phase or in all (even) network cycles associated with the second phase. The choice of the network-cycle where the first sending occurs (from the available RR cycles) may be called "Phase-Allocation" or "Phase-Assignment". When paths of individual data streams or at least shared network links are already determined, the assignment can be used to minimize the delays caused by sharing of network links between data streams or repetitive transmissions thereof. When two or more data streams share the same network link, they can interfere with—and thus delay—each other. A worst-case delay caused by interference is proportional to a number of streams sharing the same network link, scaled by the amount of data of repetitive transmissions of individual data streams or, respectively, the sizes of the repetitive transmissions of the individual data streams.

Some exemplary embodiments, implementations and further modifications will be described in conjunction with references to FIGS. 1 and 2 as well as FIGS. 5 and 6, FIGS. 5 and 6 also described in the following, and for a scenario described with reference to FIG. 3. Yet, the exemplary embodiments, implementations and further modifications may also be used for other telecommunication networks, network scheduling apparatuses, systems comprising a network scheduling apparatus and one or more originator nodes as well as for other scenarios of data streams, repetitive transmissions, repetition rates and/or phase-allocations/phase-assignments.

Figure 5:
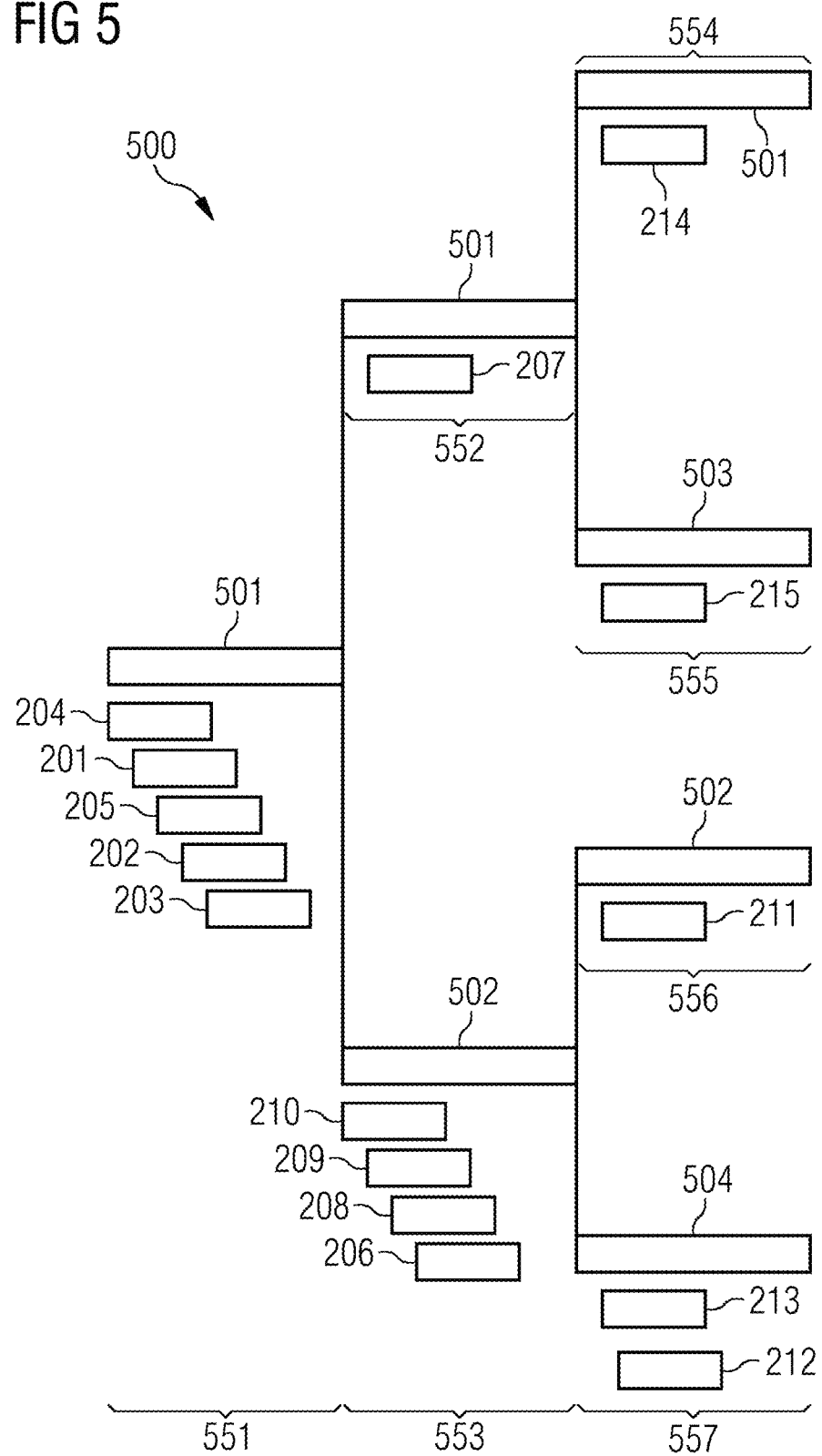
FIG. 5 schematically shows a phase assignment structure according to an embodiment for some of the data streams of the scenario of FIG. 3.

FIG. 5 schematically shows a phase assignment structure 500 for some of the data streams of the scenario of FIG. 3, the phase assignment structure incorporating teachings of the present disclosure.

In some embodiments, for repetitive transmissions having repetition rates RR=1, 2 and 4, the least common multiple of these repetition rates is 4, and, hence, there are four phases 501, 502, 503 and 504—e.g. a plurality of phases consists of the four phases—, wherein repetitive transmissions within one of these phases may be different from repetitive transmissions from one other of these phases, while more than these four phases would lead to a repetition of transmission patterns within the phases—e.g. after these four phases a pattern of the repetitive transmissions repeats. Hence, for phase-assignment it may be sufficient to assign the data streams and/or to consider a plurality of phases consisting of a number of phases equal to the least common multiple. Beneficially, in some implementations, allowed values for the repetition rates may be restricted to integer powers of two—e.g. RR=1, 2, 4, 8, . . . , 256, 512—, whereby the least common multiple is equal to the maximum value of the repetition rates, whereby the number of phases that needs to be considered may be reduced, which may increase computational efficiency and/or reduce a response time to a change of configuration of the data streams, the repetition rates and/or the network topology.

In some embodiments, the phase assignment structure 500 comprises a first data field 551 associated with the phase 501 for data streams with a repetitive transmission with a repetition rate RR=1, a second data field 552 associated with the phase 501 for data streams with RR=2 as well as third data field 553 associated with the phase 502 for data streams with RR=2, a fourth data field 554 associated with the phase 501 for data streams with RR=4 as well as a fifth data field 555 associated with the phase 503 for data streams with RR=4 as well as a sixth data field 556 associated with the phase 502 for data streams with RR=4 as well as a seventh data field 557 associated with the phase 501 for data streams with RR=4.

Figure 6:
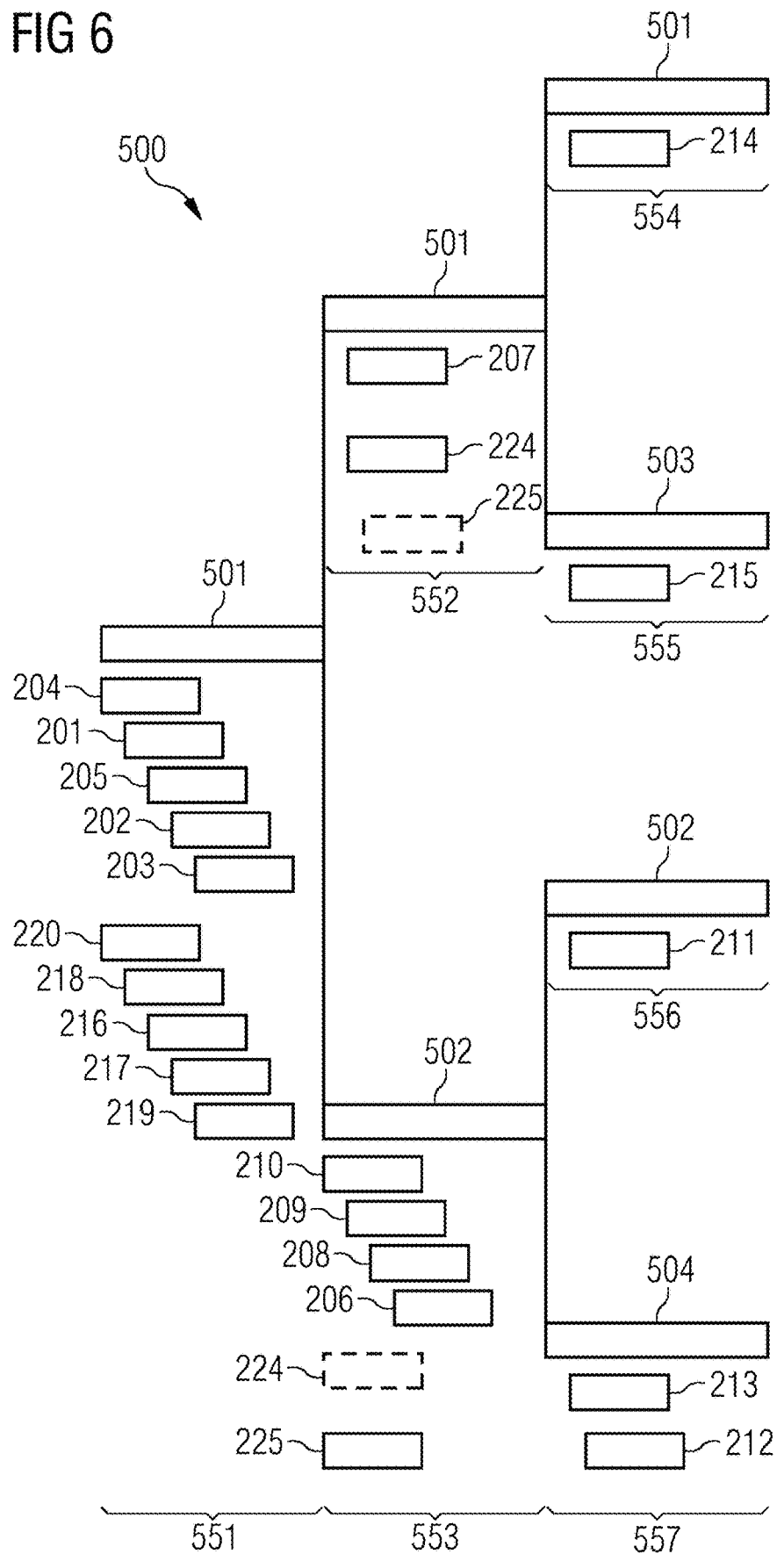
FIG. 6 schematically shows the phase assignment structure for the scenario of FIG. 3.

FIG. 6 schematically shows the phase assignment structure 500 for the scenario of FIG. 3, the phase assignment structure incorporating teachings of the present disclosure, wherein further ones of the plurality of data streams have been stored in or linked to one of the data fields.

Now referring to FIG. 4, at method step 420, a plurality of data streams, each repetition rate of each repetitive transmission of each of the plurality of data streams, a group of originator nodes—e.g. one or more network nodes of the telecommunication network being adapted to transmit a repetitive transmission of at least one of the data streams—, and one or more destination nodes—e.g. network nodes of the telecommunication network being adapted to receive a repetitive transmission of at least one of the data streams—are determined. In some implementations, for determining the plurality of data streams, the repetition rates, the originator nodes and/or the destination nodes, at least one configuration signal is received, the at least one configuration signal being indicative of at least one of them.

In some embodiments, configuration data specifying at least one of the plurality of data streams, the repetition rates, the originator nodes and/or the destination nodes may be loaded from a storage device, e.g. a storage device of the network scheduling apparatus. Moreover, a plurality of phases, which e.g. have to be considered for scheduling the transmissions of the plurality of data streams, is determined. In some implementations, the plurality of phases is determined by calculating the least common multiple (LCM-RR) of the repetition rates of the repetitive transmissions of the plurality of data streams, wherein the plurality of phases consists of a number P of phases equal to the least common multiple, e.g. a first phase 501, a second phase 502, . . . , and a P-th phase with P=LCM-RR At method step 422, a respective path through the telecommunication network is determined for each data stream of the plurality of data streams, wherein the respective path is used for the respective repetitive transmission of the respective data stream. In some implementations, for determining the respective paths, at least one configuration signal is received, the at least one configuration signal being indicative of one, some or all of the respective paths for each of the streams of the plurality of data streams.

In some embodiments, for determining the respective paths, a topology of the telecommunication network—also called "network topology" or "topology" for brevity—is determined. Based on the network topology and based on the originator and destination nodes for each data streams of the plurality of data streams at least one respective path is determined. In some implementations, in which the telecommunication network has a tree-type topology, each of the paths is uniquely determined by the respective originator and destination node.

In some embodiments, in which the telecommunication network comprises a loop, there may be multiple paths from a network node to another network node, e.g. form one of the originator nodes to one of the destination nodes. When determining at least one path from such an originator node to such a destination node, one of those multiple paths may be selected based on a path selection criterion such as a length of the path, a traveling duration along the path or a bandwidth along the path. Furthermore, the path selection criterion may also be iteratively adjusted, when multiple parts of the method 400 including the method step 422 and in particular including the determining of the paths are repeatedly performed, e.g. from a set consisting of the multiple possible paths in each repetition a different one of the set may be selected as the determined path and be used as the respective path from the originator node to the destination node. Furthermore, in some further modifications the set may be sorted, such that e.g. for a first repetition a path of the set having the lowest path length may be selected and/or an order of selecting the paths from the set for multiple repetitions may be determined by the path selection criterion e.g. by the length of the path, e.g. starting—at the first repetition—with the shortest path.

At method step 424, it is determined, for each respective path of the plurality of data streams, whether the respective path comprises a shared network link, wherein this shared network link is also part of a path of another data stream of the plurality of data streams. Furthermore, in some implementations an interference matrix such as the interference matrix described with reference to FIG. may be determined.

At method step 426, an originator node of the group of originator nodes is selected—as a selected originator node—based on an order of the selecting, such that the selected originator node has not previously been selected or has at least not previously been selected for the same paths of the plurality of data streams.

In some embodiments, before performing method step 426, method step 425 is performed, wherein the order of the selecting of the originator nodes is randomly determined, e.g. the group of originator nodes may be stored in a list data structure, wherein—for randomly determining the order—the list is shuffled based on an output of a random function.

At method step 430, an iterating over data streams of the plurality of data streams whose repetitive transmission is transmitted from the selected originator node of the group of originator nodes is initialized. The method step 430 comprises the method steps 432, 434, 436. At method step 432, a set of data streams—which may be referred to as "steam set"—is determined by selecting each data stream of the plurality of data streams whose repetitive transmission is transmitted from the selected originator node and adding it to the stream set. At method step 434, the streams of the stream set are sorted by a respective traveling duration of a respective repetitive transmission of each stream of the stream set in descending order. In some implementations, this sorting may be implemented by a quicksort algorithm. At method step 436, the streams of the sorted stream set are sorted, with a stable sort algorithm, by their respective repetition rate—i.e. the respective repetition rate of the respective repetitive transmission of each of the data streams of the sorted stream set—in ascending order. In some implementations, a mergesort algorithm may be used as the stable sort algorithm. Alternatively, in some implementations, a stable integer sort algorithm may be used such as counting sort or bucket sort.

For example, after sorting by both, the repetition rate and the traveling duration, the data streams of the scenario described with reference to FIG. 3 may be ordered in the sorted stream set as shown in the following table:

| Data Stream | Traveling duration µs | Repetition Rate RR |
| --- | --- | --- |
| 204 | 20.3 | 1 |
| 201 | 13.4 | 1 |
| 205 | 12.9 | 1 |
| 202 | 11.9 | 1 |
| 203 | 11.3 | 1 |
| 207 | 16.2 | 2 |
| 210 | 13.7 | 2 |
| 209 | 13.6 | 2 |
| 208 | 12.2 | 2 |
| 206 | 7.8 | 2 |
| 214 | 19.5 | 4 |
| 215 | 17.5 | 4 |
| 211 | 13.7 | 4 |
| 213 | 11.8 | 4 |
| 212 | 7.9 | 4 |

At method step 440, the iterating over data streams of the plurality of data streams whose repetitive transmission is transmitted from the selected originator node of the group of originator nodes is performed by iterating over the sorted stream set. The method step 440 comprises the method steps 442, 444 and 454 and the method condition 412.

At method step 442, at each iteration of the iterating a data stream is selected from the sorted stream set, the selected data stream being at the beginning of the sorted stream set, wherein the selected data stream is then removed from the sorted stream set. Alternatively, in some implementations, for selecting the respective data stream from the sorted stream set, an index variable may be initialized to point to the beginning of the sorted stream set at or before a first iteration of the iterating, at each iteration of the iterating a data stream from the sorted stream set is selected according the index variable and the index variable is adjusted to point to the next data stream of the sorted stream set. Hence, e.g., by sorting the stream set by the repetition rate and the traveling duration and then selecting each data stream according to the sorted stream set the selection criterion is based on the respective repetition rate of the respective repetitive transmission and a traveling duration of the respective repetitive transmission.

At method step 444, a phase of the plurality of phases is assigned to the selected data stream based on a distribution criterion taking into account previously selected data streams and their assignment to a respective phase. The method step 444 comprises the method steps 446, 448, 450 and 452 as well as the method condition 410.

At method step 446, a phase from the plurality of phases is selected that is smaller or equal to the respective repetition rate of the repetitive transmission of the selected data stream and that has not previously been selected for the selected data stream within the iteration of the iterating.

At method step 448, a measure of interference between the selected data stream and any data streams whose repetitive transmissions are transmitted from any previously selected originator nodes within the selected phase. In some implementations, the measure of interference for the selected phase is determined by summing over a respective duration of each of the repetitive transmissions that are transmitted from any previously selected originator node within this selected phase and whose paths comprise a shared network link being shared with the path of the selected data stream.

At method condition 410, it is determined, whether all phases from the plurality of phases that are smaller or equal to the respective repetition rate of the repetitive transmission of the selected data stream have been selected. If this is the case—symbolized by <y>—the method 400 is continued at method step 450. Otherwise—symbolized by <n>—the method 400 is continued at method step 446, wherein, e.g., a previously not selected phase is selected.

At method step 450, for each of the selected phases for which the measure of interference has been determined for the selected data stream, a sum of the respective measure of interference and a measure of a cumulative sending delay, if the cumulative sending delay has been determined in a previous iteration of the iterating for the selected originator node, is determined; otherwise the respective measure of interference is regarded as the sum, e.g. the measure of the cumulative sending delay is set to zero as a default.

At method step 452, it is determined for which one of the selected phases the respective sum is the smallest and this phase is assigned to the selected data stream. Hence, in such implementations, the sum for each of the phases is used as the distribution criterion—and is, e.g., a measure of a cumulative sending delay at the selected originator node and an interference between the selected data stream and any data streams whose repetitive transmissions are transmitted from any previously selected originator nodes—, such that previously selected data streams and their assignment to a respective phase is taking into account, whereby beneficially the data streams may be distributed of the phases.

At method condition 412, it is determined, whether all data streams from the sorted stream set have been selected. In some implementations, it may be determined whether the sorted stream set is empty. In some other implementations, it may be determined whether the index value points to a last data stream of the sorted stream set or an invalid value. If all data streams have been selected—symbolized by <y>—the method 400 is continued at method condition 414. Otherwise—symbolized by <n>—the method 400 is continued at method step 454 and then at method step 442 in a further iteration of the iterating, wherein, e.g., a further data stream, which has not been selected previously, is selected from the sorted stream set.

At method step 454, e.g. after assigning the respective phase to the selected data stream in a current iteration of the iterating and before continuing the method 400 at method step 442 in the further iteration, the measure of a cumulative sending delay at the selected originator node for the respective phase is determined taking into account a respective duration of the respective transmission of the selected data stream and of each of the previously selected data streams, whose repetitive transmissions are transmitted from the selected originator node within this phase. In some implementations, the measure of the cumulative sending delay is determined as the sum of the durations of the respective transmission of the selected data stream and of each of the previously selected data streams.

At method condition 414, it is determined whether all originator nodes of the group of originator nodes have been selected, e.g. in implementations with multiple possible paths at least for the same paths of the plurality of data streams. If this is the case—symbolized by <y>—method step 460 is performed. Otherwise—symbolized by <n>—the method 400 is continued at method step 426.

At method step 460, a transmission order for the transmitting of the repetitive transmissions at each originator node and within each phase of the plurality of phases is determined.

In some embodiments, the transmission order is simultaneously determined, when assigning a phase to each of the data streams, wherein the order of transmission at the respective originator node and for the respective phase is based on the order of assigning the respective phase to the respective data stream, such that, e.g., the repetitive transmission of the respective data stream that has been assigned first to the respective phase is also the first one according to the transmission order, the repetitive transmission whose data stream has been assigned second to the respective phase is also second with regard to the transmission order etc.

In some embodiments, a final transmission order is determined after assigning phases to each data stream of the plurality of data streams and is used as the transmission order for the scheduling. In some embodiments, a previously determined transmission order—which is based on the order of phase assignment—is used as a preliminary transmission order for distributing the repetitive transmissions over the phases taking simultaneously into account previously selected data streams and their assignment to a respective phase as well as the (potential/preliminary/previous) transmission order. In some further implementations, after phase-assignment, the (final) transmission order is determined at least based on the distributing of the repetitive transmissions over the phases—e.g. the phase-assignment which has taken simultaneously into account previously selected data streams and their assignment to a respective phase as well as the potential/preliminary/previous transmission order.

Moreover, in some further modification, the determining of the final transmission order is further based on the potential/preliminary/previous transmission order, e.g. only some of the repetitive transmissions might be rearranged within the transmission order, while the order of other repetitive transmissions is not changed, e.g. only such repetitive transmissions which would other fail to meet a scheduling constraint. Alternatively, the determining of the final transmission order may be independent from the potential/preliminary/previous transmission order, .e.g. the potential/preliminary/previous transmission order is not taken as an input for the determining of the final transmission order, yet, some (indirect) dependence may arise, e.g. due to simultaneously taking into account previously selected data streams and their assignment to a respective phase as well as the potential/preliminary/previous transmission order during phase-assignment.

In some embodiments, in which the (final) transmission order is determined after assigning phases to each data stream of the plurality of data streams, the transmission order for at least one originator node of the group of originator nodes and for at least one phase of the plurality of phases is determined by sorting, based on a comparison function taking into account a worst-case arrival time of each of the repetitive transmissions scheduled for transmission by the at least one originator node within the at least one phase.

For example, an arrival time of a (repetitive) transmission—i.e. a time relative to a beginning of a phase within which the transmission is transmitted, wherein a last bit of the transmission arrives at a respective destination node—may depend on the following:
1) Its starting time (offset with respect to the beginning of the network cycle);
2) Its length (the length/amount of data of the repetitive transmission);
3) Its path consisting of links (e.g. cables) and further network nodes (e.g. Bridges);
4) The transmission speed/bandwidth (which may vary through the network);
5) The corresponding Cable-Delays and Bridge-Delays (BDs);
6) The corresponding Forwarding mechanism in Bridges (Store & Forward (S&F), Cut-Through, . . . );
7) The corresponding Traffic-Shapers in Bridges
8) Its phase-allocation in case that its repetition rate is greater than one (RR>1);
9) Its interference with other Hi-priority streams/streams of the plurality of data streams, which e.g. share the same output port of a bridge but have arrived at different ports (or originate in that bridge, while our transmission of interest does not) and/or which e.g. share network link, i.e. wherein the paths of them have a shared network link, e.g. due to having the same output port at a bridge;
10) Its interference with streams of different priority, such as the Low-priority frames, e.g. if not (sufficiently) preempted.

For example, in order to estimate arrival times of frames, one has to deal with uncertainty of different delay variables such as the Bridge Delays, interference delays, etc. Hence, one may calculate worst-case influences of these variables and have a conservative estimate of delays that a (repetitive) transmission experiences along its path from its originator node to its destination node.

For such an (worst-case) estimation, e.g., the following assumptions may be made:
1) All bridges/further network nodes will use the delayed Cut-Through forwarding mechanism; This is beneficial, while other mechanisms such as S&F are two "slow" and they also affect the following (repetitive) transmissions, thereby, e.g., increasing a computational effort for determining (worst-case) arrival times;
2) Traffic shapers, if any, will advantageously be the Strict-Priority ones; Possible implementation of other shapers may increase the computational effort in the worst-case delay models, because they make these models more complex and expensive for optimization;
3) The lower priority transmissions, e.g. lower priority frames, can be preempted;
4) A possible interference with other streams/a worst-case delay caused by interference is proportional to the sum of amount of data of the repetitive transmissions of all other interfering streams, e.g. is proportional to the sum of the frame-lengths of all other interfering streams. This is a result of the fact that one does not have guaranteed minimum traveling durations but only upper bounds;
5) Streams at an originator node—also called a "talker"—are sent ordered by RR, i.e. all streams of RR=2 must be sent before any stream of RR=4 et cetera. When all RRs are powers of 2, this guarantees that a stream can be sent at the same time in each transmission cycle associated with one of the phases assigned to the respective data stream.

For example, under these assumptions, the arrival time of a (repetitive) transmission is equal to the sum of a transmission starting time—also called "sending time"—(e.g. an offset from the beginning of the respective phase, e.g. determined by the transmission order), the travelling duration of the transmission along its path without interference, and the possible worst-case interference with other streams which originate at different talkers/originator nodes (interference with streams that share an originator node is encoded in the transmission starting time of the transmission, e.g. by the transmission order for the respective originator node).

Hence a worst-case arrival time of a (repetitive) transmission may be calculated as: Transmission-Arrival-Time=Transmission-Start-Time+Transmission-Travel-Duration+Worst-Case-Delay-Caused-By-Interference.

After method step 460, it is determined, at method condition 416, whether a scheduling constraint is met. If this is the case—symbolized by <y>—the method 400 is continued at method step 470. Otherwise—symbolized by <n>—the method 400 is continued at method condition 418. In some implementations, the scheduling constraint is that the transmission-arrival-time of each of the repetitive transmissions is below a predetermined threshold, wherein the predetermined threshold is, in some implementations, less or equal to a duration of the phases or transmission cycles. Thereby, it may be guaranteed, that all (repetitive) transmissions arrive—e.g. at their respective destination nodes—within the phase/transmission cycle in which the have been transmitted—e.g. from/by the respective originator node.

At method condition 418, it is determined whether the selecting of the originator nodes based on a respective random order and the iterating over the data streams has been repeated at least for a predetermined number of times. If this is the case—symbolized by <y>—(and still the scheduling constraint is not met) method step 482 is performed, wherein, at method step 482, an error signal is provided, e.g. send to a network node from which at least one configuration signal has been received and/or send to at least one of the originator nodes, wherein the error signal indicates a failure to meet the scheduling constraint, e.g. no scheduling of the transmissions of the data streams could been determined in which all transmissions arrive within the phase in which they have been transmitted.

Otherwise—symbolized by <n>—the method 400 is continued at or before method step 426, wherein, e.g., the order of selecting the originator nodes is changed, such that, e.g. a scheduling fulfilling the scheduling constraint might be found. In some implementations, the predetermined number of times is based on the number of originator nodes in the group of originator nodes.

Hence, in some further implementations, the predetermined number of times may be equal to the number of originator nodes, a square root of it, or the number of originator nodes squared, wherein beneficially it is likely that a solution for the scheduling is found within those numbers of repetitions if such a solution exist, while e.g. being below an upper bound of all possible permutations. In some implementations, in which the telecommunication network comprises multiple paths for at least one of the plurality of data streams, the method 400 is continued at method step 422, wherein, e.g., another one of the multiple paths is selected for this at least one data stream, such that, e.g. a scheduling fulfilling the scheduling constraint might be found.

At method step 470, the respective repetitive transmission of each of the data streams are scheduled, wherein the respective repetitive transmission starts at the respective phase assigned to the respective data stream and is repetitively transmitted after a number of phases equal to the respective repetition rate, and wherein within each of the phases the repetitive transmissions from the same originator node are transmitted according to the transmission order.

For that purpose, in some implementations, for each phase and/or for each of the group of originator nodes, a group of repetitive transmissions from the same respective originator node is determined, wherein, for each one of the group of repetitive transmissions, the phase has been assigned to the respective data stream or another phase has been assigned to the respective data stream such that a number of the another phase—e.g. first or second phase, hence one or two—and an integer multiple of the respective repetition rate of the respective repetitive transmission—e.g. RR=1 or RR=2—is equal to a number of the phase; e.g. with the phase being the third phase—hence having the number three—and depending on the repetition rate the following is, inter alia, possible for the another phase: 1 (number of the another phase)+2*1 (repetition rate)=3 (number of the phase); or 1 (number of the another phase)+1*2 (repetition rate)=3 (number of the phase); or 2 (number of the another phase)+1*1 (repetition rate)=3 (number of the phase).

In some embodiments, a first one of the group of repetitive transmissions according to the transmission order is transmitted by the respective originator node, next a second one of the group of repetitive transmissions according to the transmission order is transmitted by the respective originator node, . . . , and last a last one of the group of repetitive transmissions according to the transmission order is transmitted by the respective originator node, wherein the transmission starting time of the first one is at a predetermined offset from the beginning of the respective phase—e.g. with the offset being zero, at the beginning of the respective phase—, the transmission starting time of the second one is at a predetermined offset from the end of the transmission of the first one—e.g. with the offset being t_gap: transmission starting time (of second one)=transmission starting time (of first one)+t_gap+transmission duration (of first one)—, etc. Hence, e.g., with all offsets being zero, relative to the beginning of the respective phase, the transmission starting time of the last one of the group of repetitive transmissions would be equal to the sum over all transmission durations of all repetitive transmissions of the group of repetitive transmissions except the last one.

For the scenario described with reference to FIG. 3, the phase assignment for data streams from the first originator node 122 by performing the exemplary embodiment of method 400 is elucidated by FIG. 5. As can be seen in FIG. 5, all streams 204, 201, 205, 202, 203 with a RR=1 from the first originator node 122 are linked to the data field 551, hence, the first phase 501 has been assigned to them, wherein they are ordered at the data field 551 according to their transmission duration. Next, from the data streams with RR=2 the data stream with the greatest transmission duration, e.g. stream 207, is linked to the data field 552 and hence the first phase has also been assigned to data stream 207. After this assignment, the cumulative sending delay for the first phase 501 is greater than the cumulative sending delay for the second phase 502 and, therefore, the second phase 502 is assigned to the other streams 210, 209, 208, 206 with RR=2 and these streams are linked to the data field 553, wherein they are ordered at the data field 553 according to their transmission duration. Likewise, the streams with RR=4 are linked to one of the data fields 554, 555, 556 and 557.

For phase assignment for data streams from the second originator node 124—of the scenario of FIG. 3—, when performing the exemplary embodiment of method 400, also the delay due to interference with the streams from the first originator node is taken into account.

Hence, for each of these data streams the (worst-case) interference delay may be summarized as in the following table:

| Data stream | Interference delay at first phase (µs) | Interference delay at second phase (µs) | Interference delay at third phase (µs) | Interference delay at fourth phase (µs) |
| --- | --- | --- | --- | --- |
| 216 | 9.4 | 22.9 | 9.4 | 13.2 |
| 217 | 16.1 | 5.9 | 18 | 5.9 |
| 218 | 24 | 24 | 20 | 27.8 |
| 219 | 24 | 24 | 20 | 27.8 |
| 220 | 20.7 | 16.5 | 16.7 | 16.5 |
| 221 | 9.4 | 22.9 | 9.4 | 13.2 |
| 222 | 16.1 | 5.9 | 18 | 5.9 |
| 223 | 24 | 24 | 20 | 27.8 |
| 224 | 24 | 24 | 20 | 27.8 |
| 225 | 20.7 | 16.5 | 16.7 | 16.5 |
| 226 | 9.4 | 22.9 | 9.4 | 13.2 |
| 227 | 16.1 | 5.9 | 18 | 5.9 |
| 228 | 24 | 24 | 20 | 27.8 |
| 229 | 24 | 24 | 20 | 27.8 |
| 230 | 20.7 | 16.5 | 16.7 | 16.5 |

As, e.g., data streams with RR=1 are transmitted in every phase, when determining the measure of interference, the maximum of the interference delay over all phases is used. As, e.g., data streams with RR=2 are transmitted in every other phase, when determining the measure of interference for the first phase, the maximum of the interference delay over first and the third phase is used, and when determining the measure of interference for the second phase, the maximum of the interference delay over second and the fourth phase is used. E.g., more general, for the measure of interference for a selected stream at a selected phase the maximum value over all phases is calculated whose number modulo the repetition rate of the selected data stream is equal to the selected phase.

As can be seen in FIG. 6, all streams 220, 218, 216, 217, 219 with a RR=1 from the second originator node 124 are linked to the data field 551, hence, the first phase 501 has been assigned to them, wherein they are ordered at the data field 551 according to their transmission duration. Next, from the data streams with RR=2 the data stream with the greatest transmission duration, e.g. stream 224, is linked to the data field 552 and hence the first phase has also been assigned to data stream 224. After this assignment, for the data stream 225 with next greatest transmission duration, however, the sum of the cumulative sending delay for the first phase 501 and the interference delay at the first/third phase (e.g. the maximum being 20.7 µs) would greater than for the second phase 502 and, therefore, the second phase 502 is assigned to the stream 225. Likewise (but not shown), phases are assigned the other streams from the second originator node.

Figure 7:
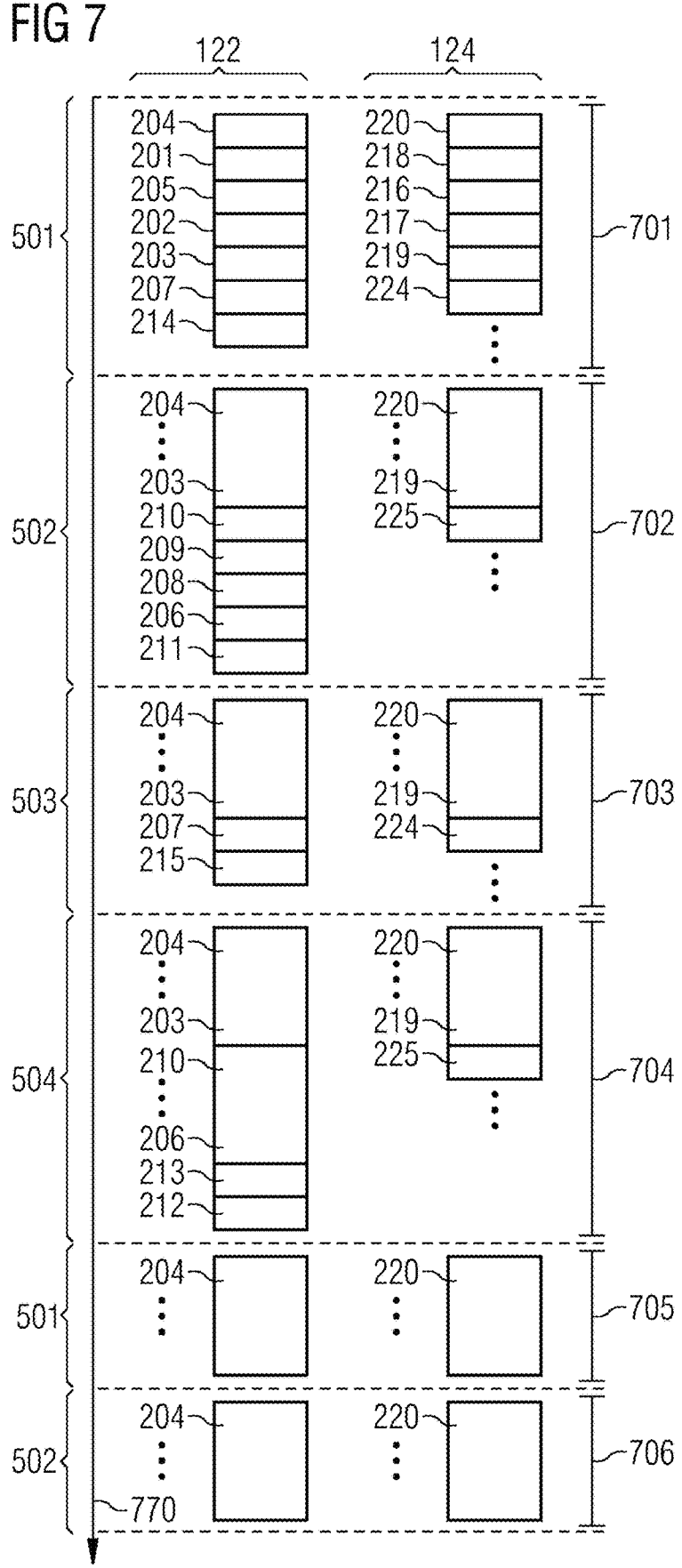
FIG. 7 schematically shows a partitioning of transmissions into transmission cycles and a cyclically association of each of the transmission cycles to a phase.

For this scenario, FIG. 7 schematically shows a partitioning of transmissions into transmission cycles 701, 702, 703, 704, 705, 706 and a cyclically association of each of the transmission cycles to a phase 501, 502, 503, 504, wherein the transmission cycles are arranged along a time axis 770.

As can be seen in FIG. 7, the data streams 204, 201, 205, 202, 203 from the first originator node with RR=1 have repetitive transmissions starting within the first phase 501, and thus, in the first transmission cycle 701 associated with the first phase 501, wherein these transmissions are repetitively transmitted in every of the following phases 502, 503, 504, an thus, in every transmission cycle 701, 702, 703, 704, 705, 706. Moreover, the repetitive transmission of data stream 207 start at phase 501, yet as it has RR=2 it is only transmitted in transmission cycles associated with phase 501 or 503, e.g. transmission cycles 701, 703, 705, . . . Moreover, the repetitive transmission of data stream 214 start at phase 501, yet as it has RR=4 it is only transmitted in transmission cycles associated with phase 501, e.g. transmission cycles 701, 705, . . . Likewise, the repetitive transmissions of the other data streams, some of which are shown in FIG. 7, are transmitted.

In some embodiments, at method step 460, the (final) transmission order is determined such that the maximum of (worst-case) arrival times over all streams is minimized. Based on the unexpected insight, that the worst-case delay due to interference from streams from other originator nodes is dependent on the phase assignment for the other originator nodes but is independent from the transmission order for the other originator nodes, the maximum arrival time over all streams is minimized by separately/independently minimizing a respective maximum/worst-case arrival time for each one of the group of originator nodes.

Hence, it can e.g. be shown for some implementations that, by independently sorting the respective streams from each respective one of the group of originator nodes and for each respective one of the plurality of phases, a maximum value of the worst-case arrival times over all streams for the respective originator node and phase has the lowest possible value, and—due to the worst-case delay caused by interference from streams from other originator nodes being independent from the transmission order for the other originator nodes—also a maximum value of the worst-case arrival times over all streams from all originator nodes and for all phases has its lowest possible value.

An implementation and proof are given in the following:

Note that worst-case interference between streams, which are sent at different talkers is only determined by phase allocation. Moreover, phase allocation also determines whether traffic and queue size restrictions at nodes are met.

Consequently, we can assume that each stream s has a fixed value v(s), representing the delays which cannot be influenced like the travelling time—e.g. traveling duration—in the network and interference resulting from previous choices (path and phase allocation).

$$v(s)=d_{const}(s)+\text{fixedInterTalkerInterference}(s) \text{ Equation: Definition } v(s)$$

Now, a brief look at the definition of the worst-case arrival time of a stream shows that stream scheduling can only influence the sending time of the frames at one talker. Therefore, frame scheduling—e.g. scheduling of transmissions for the plurality of data streams—at each talker is an independent problem and it suffices to consider the problem at one talker. Now, we want to schedule the frames such that the maximum worst-case (last bit) arrival time over all streams is minimized while respecting the constraints that streams with smaller reduction rates are sent first. Formally, the frame scheduling problem/stream scheduling problem can be formulated as follows.

Stream Scheduling Problem (SSP)

Input: A set S(t) of streams which are sent from one talker, a value function $v:S(t) \to \mathbb{R}_+$, phase assignments $$p:S(t) \to \mathbb{N}, s.t. p(s) \varepsilon [RR(s)-1]$$

Output: A partial order < on S(t) such that i. s<s' or s'<s⇔p(s)≡p(s') mod min (RR(s), RR(s')), i.e. two streams s and s' are comparable if and only one stream delays the sending time of the other.

ii. If RR(s)<RR(s'), then s<s' i.e. streams with smaller RRs are scheduled first iii. $\max_{s \in S(t)} \Sigma_{s' \in S(t): s' \le s} f(s')+v(s)$ is minimized, wherein e.g. f(s') is the transmission duration of s' and possible a offset, e.g. for providing a gap between consecutive transmissions.

First, note that for v(s) as defined in the Equation above, (iii.) corresponds exactly to the maximum arrival time if streams are sent in the order defined by the partial order output, as $\Sigma_{s' < s} f(s')$ is the sending time of s—e.g. the transmission starting time of the repetitive transmission of the data stream s. Therefore, a solution to SSP provides an optimal scheme for scheduling frames/scheduling repetitive transmissions.

We now show that, in contrast to practically all variants of the phase allocation problem, we can find an optimal stream schedule for a given fixed phase allocation—e.g. a previously determined phase assignment—very efficiently, since we can solve SSP by sorting.

Theorem: The STREAM SCHEDULING PROBLEM can be solved optimally in time 0(nlog(n)).

Proof: We show that SSP can be solved by repeatedly solving a standard scheduling problem. Consider (1|(d_j) |L_{max}). This describes in standard scheduling notation as introduced in [Graham, R. L.; Lawler, E. L.; Lenstra, J. K.; Rinnooy Kan, A. H. G. (1979). "*Optimization and Approximation in Deterministic Sequencing and Scheduling: a Survey*" (PDF). *Proceedings of the Advanced Research Institute on Discrete Optimization and Systems Applications of the Systems Science Panel of NATO and of the Discrete Optimization Symposium*. Elsevier. pp. (5) 287-326] a single machine scheduling problem where the goal is minimizing the maximum lateness of a job.

In scheduling theory, we are given a set of machines, which can process one job at a time and jobs with durations, as well as different attributes and side constraints. The goal is to schedule all jobs on the machines such that all constraints are met, and some objective function is optimized. In this case, we have only one machine. The lateness l(j) of a job j is defined as the difference between j's completion time and its due date $d_j$. The maximum lateness $L_{max}$ is then the maximum lateness over all jobs. Since the objective function requires the presence of due dates, they are often omitted in the notation, i.e. (1||$L_{max}$) is also a possible description.

This problem can be solved efficiently by applying the Earliest Due Date Rule (EDD) as a special case of Lawler's algorithm [Lawler (1973): Optimal Sequencing of a single machine subject to precedence constraints. Management Science 19, 544-546]. The correctness of Lawler's algorithm implies that scheduling the jobs according to their due date minimizes the maximum lateness.

Now, we explain how to formulate the SSP this way, hence, e.g. how to apply EDD for a technical solution for scheduling the transmissions of the plurality of data streams. We iterate over the RRs in increasing order and for each RR over the phases and consider all streams in $S^R(t)$ with a fixed phase p, let's call this set $S^R(t,p)$. Each stream $s \in S^R(t,p)$ corresponds to a job $j(s)$ with duration $f(s)$. All jobs are available for scheduling at time 0. Then, we set the due date $$d(j(s)) = -v(s) - \sum_{R \in [RR(s)/2]_2} \sum_{s' \in S^R(t):p(s')=(p \bmod RR(s'))} f(s)$$

Mathematical Claim: With $d(s)$ defined as above, the lateness of a stream is its (last bit) arrival time if streams are sent in the order indicated by the schedule.

Let the jobs $j_0, \ldots, j_n$ be ordered according to an optimal schedule and $s_0, \ldots, s_n$ be the corresponding streams. The completion time of a job in our current scheduling problem is the sum of all previously scheduled job durations and the duration of the job itself. The lateness of a job $j_i$ is therefore $$\sum_{k \leq i} f(s_k) - d(s_i) = \underbrace{\sum_{R \in [RR(s)/2]_2} \sum_{s' \in S^R(t):p(s')=(p \bmod RR(s'))} f(s) + \sum_{k<i} f(s_k) + f(s_i) + v(s_i)}_{\text{sending time of } s_i}.$$

By definition, this is the arrival time of $s_i$.

The Mathematical Claim directly implies that the maximum arrival time is minimized for each RR. The influence of streams with different RRs on the sending time is only determined by phase allocation, not by the ordering. Therefore, minimizing the maximum arrival time within each RR and phase is enough to minimize it globally.

In fact, it would be enough to minimize the arrival time for RRs which have at least one "last stream", i.e. a stream which does not delay the sending of any other stream, in order to minimize the maximum arrival time at a talker. However, we are also interested in solutions which are as resource efficient as possible. Since scheduling every RR makes the final result more efficient in terms of network resources and sorting once does not use much computational resources, the additional effort seems worth it.

To apply EDD for all RRs and phases, it is enough to sort $S(t)$ once: by RR, within each RR by phase and within each phase by due date. The required partial order is implicit, and we can compute the sending times using this order. Since sorting takes $\mathcal{O}(n \log n)$ this concludes the proof. Q.E.D.

Thereby, beneficially the running time bound refers to the problem as stated above, not to the generation of input data. Hence, once the input data is available (which is usually the case after phase allocation/phase allocation), we just showed that the minimizing of the traveling duration may be performed by a sorting algorithm, which is very efficient regarding the actual running time on a machine such the network scheduling apparatus.

In some embodiments, a phase assignment for each data stream of the plurality of data streams is determined—wherein e.g. a respective phase of the plurality of phases is assigned to each respective data stream of the plurality of data streams—by iterating over data streams of the plurality of data streams whose repetitive transmission is transmitted from a selected originator node and/or from one or more further originator nodes of the group of originator nodes. Hence, e.g., the group of originator nodes may comprise one or more originator nodes; and, e.g., for each respective originator node, a respective iterating is performed over all data streams originating from the respective originator node, wherein, e.g., within each iteration of the respective iterating a data stream of the data streams from the respective originator node is selected and a phase is assigned to this selected data stream.

In some embodiments, a phase assignment for each data stream of the plurality of data streams is determined—wherein e.g. a respective phase of the plurality of phases is assigned to each respective data stream of the plurality of data streams—by loading the phase assignment from a data storage apparatus. Hence, in some embodiments, the determining of the phase assignment of the further method comprises or consists of or is performed by loading the phase assignment from the data storage. Accordingly, in some embodiments, the further network scheduling apparatus comprises or is data connected to the data storage apparatus and the data processing apparatus is adapted to determine the phase assignment by loading it from the data storage apparatus.

In some embodiments, a phase assignment for each data stream of the plurality of data streams is determined—wherein e.g. a respective phase of the plurality of phases is assigned to each respective data stream of the plurality of data streams—by receiving the phase assignment from another network scheduling apparatus or from a user, e.g. via an input device. Hence, in some embodiments, the determining of the phase assignment of the further method comprises or consists of or is performed by receiving the phase assignment from another network scheduling apparatus or from a user, e.g. via a user input device. Accordingly, in some embodiments, the further network scheduling apparatus comprises or is data connected to the user input device, wherein the user input device is adapted to request and/or process user input that specifies the phase assignment and to transmit the user input/phase assignment to the (further) network scheduling apparatus, and wherein the data processing apparatus is adapted to determine the phase assignment by receiving and processing the user input/receiving the phase assignment from the user input device.

In some embodiments, the respective repetitive transmission of each of the data streams are scheduled—e.g. by a scheduling signal send to at least one or to all of the group of originator nodes—, wherein the respective repetitive transmission starts at the respective phase assigned to the respective data stream and is repetitively transmitted after a number of phases equal to the respective repetition rate.

In some embodiments, in which the respective repetitive transmission of each of the data streams are scheduled to start at the respective phase assigned to the respective data stream and to be repetitively transmitted after the number of phases equal to the respective repetition rate, within each of the phases the repetitive transmissions from the same originator node are transmitted according to a transmission order.

In some embodiments, in which the repetitive transmissions from the same originator node are transmitted according to a transmission order, the method or the further method comprises determining—e.g. after assigning phases to each data stream of the plurality of data streams and/or prior to scheduling the respective repetitive transmission of each of the data streams—the transmission order for at least one originator node of the group of originator nodes and for at least one phase of the plurality of phases based on the assigning of the phases to each data stream of the plurality of data streams.

In some embodiments, in which the repetitive transmissions from the same originator node are transmitted according to a transmission order, the method or the further method comprises determining—e.g. after assigning phases to each data stream of the plurality of data streams and/or prior to scheduling the respective repetitive transmission of each of the data streams—the transmission order for at least one originator node of the group of originator nodes and for at least one phase of the plurality of phases by sorting—e.g. by means of a sorting algorithm—, based on a comparison function taking into account a worst-case arrival time of the repetitive transmissions scheduled for transmission by the at least one originator node within the at least one phase.

In some embodiments, in which for determining a transmission order of repetitive transmissions for at least one originator node of the group of originator nodes and for at least one phase of the plurality of phases a worst-case arrival time of the repetitive transmissions is taken into account, the worst-case arrival time of a current one of the repetitive transmissions is determined based on the assigning of the phases to each data stream of the plurality of data streams and based on the transmission order of further ones of the repetitive transmissions being scheduled for transmission prior to the current one, but is e.g. independent of possibly further transmission orders for other originator nodes of the group of originator nodes and/or for other phases of the plurality of phases.

In some embodiments, in which the repetitive transmissions from the same originator node are transmitted according to a transmission order, the transmission order is determined by an order of the assigning of a respective phase to each one of the data streams.

In some embodiments, the selection criterion is based on the respective repetition rate of the respective repetitive transmission and a traveling duration of the respective repetitive transmission.

In some embodiments, the method further comprises sorting data streams from the plurality of data streams whose repetitive transmission is transmitted from the selected originator node by their respective repetition rate in ascending order. This may beneficially allow to select streams that are transmitted more often earlier such that, e.g., distributing over the phases may be improved and/to a relative starting time of repetitive transmissions remains the same for all phases in which they are transmitted, because other transmission, which are transmitted with a higher frequency, e.g. have a lower repetition rate, will have already been transmitted within the assigned phases.

In some embodiments, the method further comprises further sorting the sorted data streams having the same repetition rate by their respective traveling duration in descending order. Moreover, the iterating and the selecting of a data stream is performed by iterating through the sorted data streams. This may beneficially allow to consider such data streams earlier within the phase assignment, which are more critical to a worst-case arrival time as, e.g., a likelihood of a late arrival—i.e. the arrival time of the transmission being greater than a predetermined upper boundary—usually increases when the traveling duration is larger.

In some embodiments, the selection criterion is selected from a group comprising: the respective repetition rate, a duration of the respective repetitive transmission, a traveling duration of the respective repetitive transmission, a length of a path used form the respective repetitive transmission, an amount of data of the respective repetitive transmission or a combination thereof.

In some embodiments, the group of originator nodes comprises the first originator node and a second originator node. Moreover, the method further comprises selecting the second originator node, after selecting the first originator node and assigning phases to the data streams whose repetitive transmission is transmitted from the second originator node. Moreover, the method further comprises iterating over data streams of the plurality of data streams whose repetitive transmission is transmitted from the second originator node of the group of originator nodes for assigning phases to them.

In some embodiments, in which the group of originator nodes comprises the first and the second originator node, wherein the group of originator nodes further comprises one or more further originator nodes, wherein each originator node of the group of originator nodes is the selected and the iterating is performed for each of the originator nodes.

In some embodiments, in which the group of originator nodes comprises more than one originator node, an order of the selecting of each of the originator nodes is randomly determined. Moreover, at least the selecting in a randomly determined order and the iterating is repeated at least for a predetermined number of times until a scheduling criterion is met.

In some embodiments, the telecommunication network comprises, for each data stream of the plurality of data streams, a respective path through the telecommunication network, the respective path being used for the respective repetitive transmission of the respective data stream. Moreover, the method further comprises determining, for each respective path, whether the respective path comprises a shared network link, wherein this shared network link is also part of a path of another data stream of the plurality of streams. Moreover, a measure of interference for a phase of the plurality of phases between the selected data stream, being selected at an iteration of the iterating, and any data streams, whose repetitive transmissions are transmitted from any previously selected originator node within this phase and whose paths comprise a shared network link being shared with the path of the selected data stream, is the sum over a respective duration of each of the repetitive transmissions.

In some embodiments, wherein the distribution criterion is a measure of a cumulative sending delay at the selected originator node and an interference between the selected data stream and any data streams whose repetitive transmissions are transmitted from any previously selected originator nodes.

In some embodiments, the iterating further comprises determining, after assigning the respective phase to the selected data stream in an iteration of the iterating, a measure of a cumulative sending delay at the selected originator node for the respective phase taking into account a respective duration of the respective transmission of the selected data stream and of each of the previously selected data streams, whose repetitive transmissions are transmitted from the selected originator node within this phase.

In some embodiments, the iterating further comprises determining, when assigning the respective phase to the selected data stream, a measure of interference between the selected data stream and any data streams whose repetitive transmissions are transmitted from any previously selected originator nodes for each phase of the plurality of phases being smaller or equal to the respective repetition rate of the repetitive transmission of the selected data stream and assigning the phase to the selected data stream that has the smallest sum of the measure of interference and the measure of the cumulative sending delay, if the cumulative sending delay has been determined in a previous iteration of the iterating for the selected originator node.

In some embodiments, transmissions through the telecommunication network—e.g. the repetitive transmissions of the plurality of data streams—are partitioned into transmission cycles, wherein the transmission cycles are cyclically associated with one of the plurality of phases. According to some implementations, the plurality of phases may define a phase cycle, which is repeated for associating each one of the transmission cycles with one of the plurality of phases. According to some implementations, the plurality of phases may comprise a first phase, a second phase, . . . , and a last phase, wherein the phases of the plurality of phases are ordered by time.

Furthermore, the transmission cycles are ordered by time, wherein, e.g., transmissions within a first transmission cycle of the transmission cycles are performed before transmissions within a second transmission cycle of the transmission cycles, and wherein the transmissions of the second transmission cycle are performed before transmissions of a third transmission cycle of the transmission cycles etc. Moreover, the transmission cycles are cyclically associated with one of the plurality of phases by associating each one of consecutive transmission cycles of the transmission cycles with consecutive ones of the plurality of phases, starting with the first transmission cycle and the first phase, until all of the phases have been associated with one of the consecutive transmission cycles and repeating this associating, starting with a next one of the transmission cycles and the first phase.

For example, the transmission cycles are cyclically associated with one of the plurality of phases by associating the first transmission cycle with the first phase, associating the second transmission cycle with the second phase, . . . until a transmission cycle is associated with the last phase; and then associating a transmission cycle of the transmission cycles following after the transmission cycle, which has previously been associated with the last phase, with the first phase, associating a transmission cycle following after this transmission cycle, which has been associated with the first phase, with the second phase etc. Hence, in some implementations, within the phase cycle defined by the plurality of phases, a number of consecutive transmission cycles equal to a number of phases of the plurality of phases may each be associated with one of the plurality of phases, wherein the phase cycle is repeated for a next number of consecutive transmission cycles equal to the number of phases and following the previous transmission cycles for associating each one of these consecutive transmission cycles with one of the plurality of phases, and wherein this associating may be further repeated for further (consecutive) network cycles.

In some embodiments, in which transmissions through the telecommunication network are partitioned into transmission cycles, the transmission cycles have a predetermined length in time—e.g. a predetermined duration. Moreover, the phases of the plurality of phases have a predetermined duration equal to the predetermined duration of the transmission cycles.

By determining the phases of the repetitive transmissions for the data streams and by scheduling the repetitive transmissions with respect to the transmission cycles, the determining based on the distributing the data streams over the phases and/or the scheduling and transmitting of data—e.g. the transmission of the repetitive transmissions through the telecommunication network—may be simplified, wherein e.g. timing with a high precision—i.e. a precision enabling to distribute transmissions within one transmission cycle, typically being in the range of 200 ns to 100 μs—is not required, but it is, e.g., sufficient to synchronize the timing of data transmission in accordance with the transmission cycles, which may, e.g., have a typical time interval in the order of 500 μs to 50 ms, typically about 1 ms.

Moreover, while e.g., originator nodes—e.g. nodes of the telecommunication network transmitting at least one of the repetitive transmissions—may be required to synchronize their transmissions according to the transmission cycles, and thus to use a synchronized timebase, other nodes of the telecommunication network do not necessarily require the use of a synchronized timebase—e.g. at least as long as these nodes do not transmit data transmissions interfering with the repetitive transmissions, i.e. in particular transmit these data transmissions during transmission cycles for the repetitive transmissions or a part of the transmission cycles reserved for the repetitive transmissions, and/or at least as long as data transmissions these nodes have a lower priority than the repetitive data transmissions of the data streams, and thus are rejected or buffered for a later transmission. Yet, e.g., some or all of the other nodes may be required to at least forward a time synchronization signal, in order to provide the time synchronization signal to the originator nodes, wherein each node of the originator nodes is adapted to establish the synchronized timebase based on the time synchronization signal.

In some embodiments, in which transmissions through the telecommunication network are partitioned into transmission cycles, the telecommunication network is a time sensitive network.

Within the meaning of the present application a "time sensitive network" may refer to a telecommunication network, wherein the telecommunication network is adapted to transfer time-sensitive data based on network cycles, wherein all nodes of the telecommunication network have a common timebase. Moreover, such a time sensitive network may be adapted for a time-sensitive transmission of data over Ethernet networks. For this purpose, the time sensitive network may have a central instance that is adapted to provide a time synchronization signal.

Furthermore, all nodes may be adapted to—at least—forward the time synchronization signal. Furthermore, some of the nodes—e.g. nodes transmitting data—may be adapted to establish a synchronized timebase based on the time synchronization signal. Moreover, such a time sensitive network may be according to the Ethernet standards under IEEE 802.1Q. Hence, data transfer may be partitioned into time-sensitive data transfer and other data transfer, wherein the time-sensitive data transfer may be transmitted via a Virtual LAN defined on top an underlying telecommunication network—e.g. the time sensitive network as a whole—, the underlying telecommunication network according to Ethernet standards such as IEEE 802.3. Further details regarding a telecommunication network according to Ethernet standards are, e.g., be given by https://en.wikipedia.org/wiki/Ethernet
    e.g. in a version dated Aug. 4, 2019
    https://en.wikipedia.org/w/
        index.php?title=Ethernet&oldid=909327 347
    and further details regarding a time sensitive network are,
      e.g., given by https://en.wikipedia.org/wiki/Time-Sensitive_Networking
e.g. in a version dated Jul. 13, 2019
https://en.wikipedia.org/w/index.php?title=Time-Sensitive_Networking&oldid=906080116.

For example, for an embodiment, in which the telecommunication network is a time sensitive network, or for an embodiment used for controlling a time critical process such as a manufacturing process or a process for controlling an—e.g. autonomous—vehicle, a requirement may be that all high-priority data transmissions, e.g. the repetitive data transmissions—reach their respective destination node within one network cycle without loss of transmissions, e.g. without frame losses. Hence, the telecommunication network has to be planned and/or provided including the data transmission sending order—e.g. the order of the transmission of the repetitive transmissions—, paths through the telecommunication network for transmitting the repetitive transmissions, and a phase-allocation. These requirements may beneficially be fulfilled by combining a time sensitive network as the telecommunication network with the determining of the phases based on the numerical optimization and the scheduling of the repetitive transmissions according to the phases and with respect to the network cycles. Moreover, by means of a preemption mechanism interference of data transmissions having a lower priority may beneficially be avoided.

In some embodiments, e.g. in which in which the telecommunication network is a time sensitive network, the (repetitive) transmissions are implemented as frames such as Ethernet frames. Accordingly, a (repetitive) transmission may also be called a frame.

In some embodiments, the respective repetitive transmissions of each of the data streams have a high priority, whereas, other data transmissions have a low priority, wherein at least a certain amount of data transmissions having a high priority is transmitted before data transmissions having a low priority are transmitted, e.g. at/through a network link. In some implementations, also the data transmissions having a low priority are scheduled based on a phase allocation—e.g. based on respective phases—, which is/are determined based on an optimization similar or equal to the numerical optimization. This may beneficially improve the utilization of a bandwidth of the telecommunication network.

Within the meaning of the present application a "high-priority" or, respectively, a "low priority" may at least refer to the terms used, e.g., with regard to Ethernet standards. Moreover, these terms may also refer to a relative priority, wherein data transmissions with a high priority have a higher priority than data transmissions with a low priority, or, respectively, data transmissions with a low priority have a lower priority than data transmissions with a high priority.

In some embodiments, in which a transmission order of at least one group of repetitive transmissions for at least one originator node of the group of originator nodes and for at least one phase of the plurality of phases is determined, each respective repetitive transmission of the at least one group is from a respective data stream from the at least one originator node, wherein the at least one phase has been assigned to the respective data stream or another phase has been assigned to the respective data stream such that a number of the another phase and an integer multiple of the respective repetition rate of the respective repetitive transmission is equal to a number of the at least one phase.

In some embodiments, in which a transmission order—e.g. of at least one group of repetitive transmissions—is determined for at least one originator node of the group of originator nodes and for at least one phase of the plurality of phases, the determining of the transmission order takes into account an order criterion such as a worst-case arrival time of repetitive transmissions scheduled for being transmitted by the at least one originator node within the at least one phase according to their phase assignments and repetition rates—e.g. the at least one group of repetitive transmissions consisting of the repetitive transmissions scheduled for being transmitted.

In some embodiments, in which a transmission order of at least one group of repetitive transmissions for at least one originator node of the group of originator nodes and for at least one phase of the plurality of phases is determined, the determining of the transmission order comprises—e.g. is performed by—sorting the at least one group of repetitive transmissions taking into account a respective order criterion such as a respective worst-case arrival time of each repetitive transmission of the at least one group.

In some embodiments, the (respective) order criterion is a criterion related to a worst-case estimation such as a worst-case arrival time. This may allow to determine a transmission order for an originator node and for a phase—e.g. taking into account such an order criterion—based on the phase assignment but independent from other phases and/or independent from possible transmission orders for other originator nodes.

Within the meaning of the present application a "worst-case" may at least refer to an estimation for a scenario, wherein from one or more possibilities, e.g. realizations of the scenario, the worst one is chosen. By such an estimation it may be guaranteed that if a condition or constraint is met in the worst-case, it will also be met in all other possible realizations of the scenario. For example, for a worst-case delay caused by interference every possible interference of a respective transmission with any other transmission that may eventually interfere, e.g. which is transmitted within the same phase and which shares at least one link or node with the respective node, is taken into account, e.g. added up. Likewise, a worst-case arrival time of a (repetitive) transmission, e.g. a Transmission-Arrival-Time, may be calculated as the sum of the Transmission-Start-Time and the Transmission-Travel-Duration and the Worst-Case-Delay-Caused-By-Interference, wherein typically the Transmission-Start-Time is (pre-) determined—e.g. by a transmission order—and the Transmission-Travel-Duration is fixed due to a (pre-) determined path through the telecommunication network and thus have only one possibility and/or always represent/realize the best as well as the worst case.

In case of transmissions that may be transmitted along at least two paths, also for the Transmission-Travel-Duration a worst case Transmission-Travel-Duration may be used, i.e. the path of the at least two paths that results in the longer travel duration also this path. Consequently, the worst-case arrival time of a (repetitive) transmission of a data stream may also be referred to as "maximum arrival time" as the worst-case arrival time is the maximum of all possible arrival times of the (repetitive) transmission, e.g. for a given phase, taking into account any possible interference, whereas in other realizations resulting in another one of the possible arrival times some of the interferences with other transmissions might not occur. Moreover, a "maximum arrival time" may also refer to a maximum arrival time over all (data) streams, e.g. from one or some or all of the group of originator nodes, wherein this maximum arrival time over all of these streams is a maximum value of each of the maximum/worst-case arrival times of each of the (repetitive)

transmissions of these data streams and possibly over all phases of the plurality of phases or, respectively, with respect to one phase of the plurality of phases.

In some embodiments, in which a transmission order of at least one group of repetitive transmissions is determined by sorting—e.g. comprising, consisting of, or being performed by sorting and e.g. by means of a sorting algorithm—, the sorting is based on a comparison function taking into account a respective order criterion such as a respective worst-case arrival time of each repetitive transmission of the at least one group.

Although the teachings of the present disclosure have been shown and described with respect to certain embodiments, equivalents and modifications will occur to others skilled in the art upon reading and understanding the specification. The scope of the present disclosure includes all such equivalents and modifications.

What is claimed is:

1. A method for scheduling transmissions of a plurality data streams through a telecommunication network, wherein a respective repetitive transmission of each of the plurality of data streams is transmitted from a first originator node of a group of originator nodes, in one or more of a plurality of phases according a respective repetition rate of the respective repetitive transmission, the method comprising:
    selecting the first originator node from the group of originator nodes;
    iterating over first data streams of the plurality of data streams whose repetitive transmissions is transmitted from the first originator node; and
    at each iteration of the iterating: selecting, based on a selection criterion, a data stream from the first data streams from the selected first originator node, and assigning a corresponding phase of the plurality of phases to the selected first data stream based on a distribution criterion taking into account previously selected data streams and their assignments assignment to respective phases of the plurality of phases;
    wherein the respective repetitive transmission of each of the first data streams is scheduled according to the respective selected phase; and
    wherein the selection criterion comprises at least one criterion selected from the group consisting of: the respective repetition rate, a duration of the respective repetitive transmission, a traveling duration of the respective repetitive transmission, a length of a path used for the respective repetitive transmission, and an amount of data of the respective repetitive transmission.

2. The method of claim 1, further comprising:
    determining, after assigning the corresponding phase to each of the first data streams of the plurality of data streams, a transmission order for at least one originator node of the group of originator nodes and for at least one phase of the plurality of phases based on the assigning of the phase phases to each of the first data streams data stream of the plurality of data streams; and
    scheduling the respective repetitive transmission of each of the first data streams, wherein the respective repetitive transmission starts at the respective phase assigned to the respective data stream and is repetitively transmitted after a number of phases equal to the respective repetition rate, and wherein within each of the phases, the repetitive transmissions from the same originator node are transmitted according to the transmission order.

3. The method of claim 1, further comprising scheduling the respective repetitive transmission of each of the first data streams;
    wherein the respective repetitive transmission starts at the respective phase assigned to the respective data stream and is repetitively transmitted after a number of phases equal to the respective repetition rate, and wherein within each of the phases, the repetitive transmissions from the same originator node are transmitted according to a transmission order; and
    the transmission order is determined by an order of the assigning of a respective phase to each one of the data streams.

4. The method of claim 1, wherein:
    the selection criterion is based on the respective repetition rate of the respective repetitive transmission and a traveling duration of the respective repetitive transmission, and
    the method further comprises sorting the first data streams from the plurality of data streams whose repetitive transmission is transmitted from the selected first originator node by their respective repetition rates in an ascending order, and further sorting the sorted data streams having matching repetition rates by their respective traveling durations in a descending order;
    wherein the iterating and the selecting of the data stream is performed by iterating through the sorted data streams.

5. The method of claim 1, further comprising:
    selecting a second originator node, after selecting the first originator node and assigning phases to second data streams of the plurality of data streams whose repetitive transmission is transmitted from the second originator node;
    iterating over the second data streams of the plurality of data streams whose repetitive transmission is transmitted from the second originator node of the group of originator nodes for assigning the phases to the second data streams.

6. The method of claim 5, wherein:
    the group of originator nodes further further comprises one or more further one or more third originator nodes;
    each originator node is the selected the selecting and the iterating are performed for each of the third originator nodes;
    an order of the selecting of each of the third originator nodes is randomly determined; and
    wherein at least the selecting in the randomly determined order and the iterating are repeated at least for a predetermined number of times until a scheduling constraint is met.

7. The method of claim 5, wherein:
    the telecommunication network comprises, for each data stream of the plurality of data streams, a respective path through the telecommunication network, the respective path being used for the respective repetitive transmission of the respective data stream; and
    the method further comprises determining, for each respective path, whether the respective path comprises a shared network link, wherein the shared network link is a part of a path of another data stream of the plurality of streams; and
    a measure of interference for a phase of the plurality of phases between the selected data stream selected at an iteration of the iterating and other data streams, wherein repetitive transmissions of the other data streams are transmitted from a previously selected originator node within the respective phase and paths of the second data streams comprise a shared network link shared with the path of the selected data stream, is equal to a sum over a respective duration of each of the repetitive transmissions.

8. The method of claim 1, wherein the distribution criterion is a measure of a cumulative sending delay at the selected first originator node and an interference between the selected data stream and other data streams whose repetitive transmissions are transmitted from a previously selected originator nodes.

9. The method of claim 1, wherein the iterating comprises:
determining, after assigning the respective phase to the selected data stream in an iteration of the iterating, a measure of a cumulative sending delay at the selected first originator node for the respective phase taking into account a respective duration of the respective transmission of the selected data stream and of each of the previously selected data streams, whose repetitive transmissions are transmitted from the selected originator node within the respective phase; and
determining, when assigning the respective phase to the selected data stream, a measure of interference between the selected data stream and other data streams whose repetitive transmissions are transmitted from a previously selected originator nodes for each phase of the plurality of phases being smaller or equal to the respective repetition rate of the repetitive transmission of the selected data stream and assigning the phase to the selected data stream that has a smallest sum of the measure of interference and the measure of the cumulative sending delay, if the cumulative sending delay has been determined in a previous iteration of the iterating for the selected originator node.

10. The method of claim 1, wherein:
the telecommunication network comprises a time sensitive network;
the transmissions are partitioned into transmission cycles, the transmission cycles having a predetermined duration; and
the transmission cycles are cyclically associated with one of the plurality of phases.

11. A computer-implemented method for scheduling transmissions of a plurality data streams through a telecommunication network, wherein a respective repetitive transmission of each of the plurality of data streams is transmitted, from an originator node of a group of originator nodes, in one or more of a plurality of phases according a respective repetition rate of the respective repetitive transmission, the method comprising:
determining a phase assignment for each data stream of the plurality of data streams, wherein a respective phase of the plurality of phases is assigned to each respective data stream of the plurality of data streams; and
determining, after assigning the respective phase to each data stream of the plurality of data streams, a transmission order of at least one group of repetitive transmissions for at least one originator node of the group of originator nodes and for at least one phase of the plurality of phases based on phase assignments for each data stream of the plurality of data streams; and
wherein the selection criterion comprises at least one criterion selected from the group consisting of: the respective repetition rate, a duration of the respective repetitive transmission, a traveling duration of the respective repetitive transmission, a length of a path used for the respective repetitive transmission, and an amount of data of the respective repetitive transmission.

12. The method of claim 11, wherein determining the transmission order takes into account an order criterion such as a worst-case arrival time of repetitive transmissions scheduled for being transmitted by the at least one originator node within the at least one phase according to their phase assignments and repetition rates.

13. The method of claim 11, wherein:
each respective repetitive transmission of the at least one group is from a respective data stream from the at least one originator node;
the at least one phase has been assigned to the respective data stream or another phase has been assigned to the respective data stream such that a number of the another phase and an integer multiple of the respective repetition rate of the respective repetitive transmission is equal to a number of the at least one phase; and
determining the transmission order includes sorting the at least one group of repetitive transmissions taking into account a respective worst-case arrival time of each repetitive transmission of the at least one group.

14. A network scheduling apparatus for a telecommunication network, wherein a respective repetitive transmission of each of a plurality of data streams is transmitted, from an originator node of a group of originator nodes of the telecommunication network, in one or more of a plurality of phases according a respective repetition rate of the respective repetitive transmission; the network scheduling apparatus comprising:
a data processing apparatus programmed to:
select a first originator node from the group of originator nodes;
iterate over first data streams of the plurality of data streams whose repetitive transmission is transmitted from the selected first originator node; and
wherein the data processing apparatus programmed to, at each iteration:
select, based on a selection criterion, a data stream from the first data streams from the selected first originator node; and
assign a phase of the plurality of phases to the selected data stream based on a distribution criterion taking into account previously selected data streams and their assignments assignment to respective phases of the plurality of phases;
wherein the respective repetitive transmission of each of the first data streams is scheduled according to the respective selected phase; and
wherein the selection criterion comprises at least one criterion selected from the group consisting of: the respective repetition rate, a duration of the respective repetitive transmission, a traveling duration of the respective repetitive transmission, a length of a path used for the respective repetitive transmission, and an amount of data of the respective repetitive transmission.

15. The network scheduling apparatus of claim 14, wherein determining the transmission order takes into account an order criterion such as a worst-case arrival time of repetitive transmissions scheduled for being transmitted by the at least one originator node within the at least one phase according to their phase assignments and repetition rates.

16. The network scheduling apparatus of claim 14, wherein:

each respective repetitive transmission of the at least one group is from a respective data stream from the at least one originator node;

the at least one phase has been assigned to the respective data stream or another phase has been assigned to the respective data stream such that a number of the another phase and an integer multiple of the respective repetition rate of the respective repetitive transmission is equal to a number of the at least one phase; and determining the transmission order includes sorting the at least one group of repetitive transmissions taking into account a respective worst-case arrival time of each repetitive transmission of the at least one group.

\* \* \* \* \*